United States Patent
Chang et al.

(10) Patent No.: US 12,216,981 B2
(45) Date of Patent: Feb. 4, 2025

(54) SYSTEM AND METHOD FOR GENERATING LAYOUT DIAGRAM INCLUDING WIRING ARRANGEMENT

(71) Applicant: TAIWAN SEMICONDUCTOR MANUFACTURING COMPANY, LTD., Hsinchu (TW)

(72) Inventors: Fong-Yuan Chang, Hsinchu (TW); Chin-Chou Liu, Hsinchu (TW); Hui-Zhong Zhuang, Hsinchu (TW); Meng-Kai Hsu, Hsinchu (TW); Pin-Dai Sue, Hsinchu (TW); Po-Hsiang Huang, Hsinchu (TW); Yi-Kan Cheng, Hsinchu (TW); Chi-Yu Lu, Hsinchu (TW); Jung-Chou Tsai, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/448,143

(22) Filed: Aug. 10, 2023

(65) Prior Publication Data
US 2023/0385522 A1    Nov. 30, 2023

Related U.S. Application Data

(60) Continuation of application No. 17/885,106, filed on Aug. 10, 2022, now Pat. No. 11,790,151, which is a
(Continued)

(51) Int. Cl.
*G06F 30/398*   (2020.01)
*G06F 30/392*   (2020.01)
(Continued)

(52) U.S. Cl.
CPC .......... *G06F 30/398* (2020.01); *G06F 30/392* (2020.01); *G06F 30/394* (2020.01); *G06F 2119/18* (2020.01)

(58) Field of Classification Search
USPC ........................................................ 703/13
See application file for complete search history.

(56) References Cited

U.S. PATENT DOCUMENTS 10,990,731 B1 *   4/2021   Odabasi ................ G06F 30/337
11,544,552 B1 *   1/2023   Londeree ............... G06N 3/084
(Continued)

*Primary Examiner* — Mohammed Alam
(74) *Attorney, Agent, or Firm* — Hauptman Ham, LLP

(57) ABSTRACT

A system (for generating a layout diagram of a wire routing arrangement) includes a processor and memory including computer program code for one or more programs, the system generating the layout diagram including: placing, relative to a given one of masks in a multi-patterning context, a given cut pattern at a first candidate location over a corresponding portion of a given conductive pattern in a metallization layer; determining that the first candidate location results in an intra-row non-circular group of a given row which violates a design rule, the intra-row non-circular group including first and second cut patterns which abut a same boundary of the given row, and a total number of cut patterns in the being an even number; and temporarily preventing placement of the given cut pattern in the metallization layer at the first candidate location until a correction is made which avoids violating the design rule.

20 Claims, 15 Drawing Sheets

Related U.S. Application Data division of application No. 16/299,973, filed on Mar. 12, 2019, now Pat. No. 11,775,727.

(60) Provisional application No. 62/644,306, filed on Mar. 16, 2018.

(51) Int. Cl.
*G06F 30/394* (2020.01)
*G06F 119/18* (2020.01)

(56) References Cited

U.S. PATENT DOCUMENTS

| | | | |
|---|---|---|---|
| 2004/0015796 A1* | 1/2004 | Frank | G06F 30/394 716/112 |
| 2005/0076316 A1* | 4/2005 | Pierrat | G06F 30/398 716/52 |
| 2008/0098335 A1* | 4/2008 | Allen | G06F 30/367 716/120 |
| 2014/0259658 A1 | 9/2014 | Hsu | |
| 2016/0190287 A1 | 6/2016 | Hsu | |
| 2016/0320706 A1 | 11/2016 | Hsu et al. | |
| 2017/0242953 A1* | 8/2017 | Pikus | G06F 30/398 |
| 2018/0068046 A1* | 3/2018 | Lin | G06F 30/394 |
| 2019/0286784 A1* | 9/2019 | Chang | G06F 30/39 |
| 2020/0066525 A1 | 2/2020 | Chen et al. | |
| 2020/0074043 A1 | 3/2020 | Chang et al. | |
| 2020/0081479 A1* | 3/2020 | Kalyanam | H03L 7/0802 |
| 2021/0004518 A1 | 1/2021 | Chang et al. | |
| 2022/0382957 A1* | 12/2022 | Chang | G06F 30/394 |

* cited by examiner

SYSTEM AND METHOD FOR GENERATING LAYOUT DIAGRAM INCLUDING WIRING ARRANGEMENT

PRIORITY CLAIM

The present application is a continuation of U.S. patent application Ser. No. 17/885,106, filed Aug. 10, 2022, now U.S. Pat. No. 11,790,151, issued Oct. 17, 2023, which is a divisional of U.S. patent application Ser. No. 16/299,973, filed Mar. 12, 2019, now U.S. Pat. No. 11,775,727, issued Oct. 3, 2023, which claims priority to U.S. Provisional Application No. 62/644,306, filed Mar. 16, 2018, each of which is incorporated herein in entirety by reference.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process/technology node by which will be fabricated a semiconductor device based on a layout diagram. The design rule set compensates for variability of the corresponding process/technology node. Such compensation increases the likelihood that an actual semiconductor device resulting from a layout diagram will be an acceptable counterpart to the virtual device on which the layout diagram is based.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1:
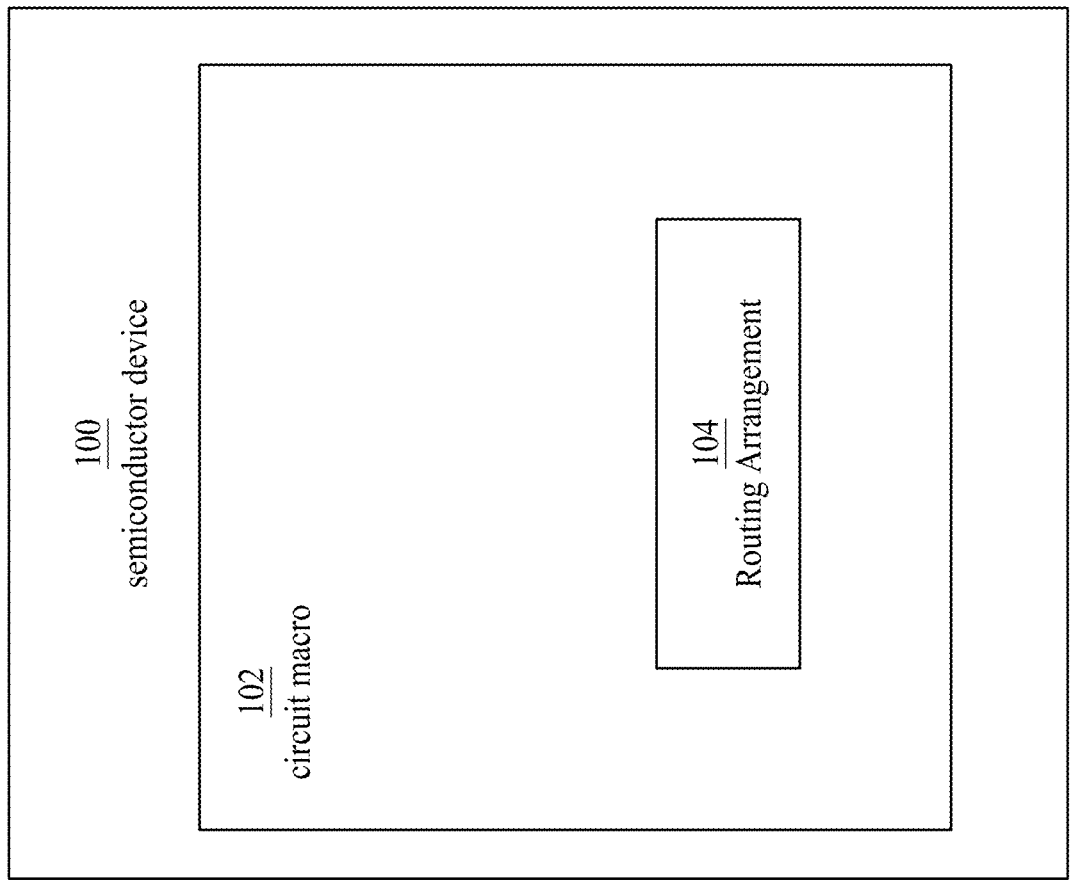
FIG. 1 is a block diagram of a semiconductor device in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, in a multi-patterning context, a method of generating a layout diagram of a wire routing arrangement seeks to reduce (if not prevent) violations of design rules related to non-circular groups and/or cyclic groups, the method including: attempting to place a cut pattern in a first candidate location in a targeted metallization layer, determining that the first candidate location would result in at least one of a non-circular group or a cyclic group which would violate a given design rule which relates to non-circular groups; and temporarily preventing placement of the cut pattern in the targeted metallization layer at the first candidate location until a correction is made which avoids triggering the given design rule violation. Such correction is referred to as pre-completion checking because the given design rule compliance-check and the associate correction(s) takes place before the initial completion of the layout diagram. In some embodiments, multi-row cyclic groups are treated as being comprised of non-circular groups, and pre-completion checking is applied to non-circular groups as well as to cyclic groups.

According to another approach, violations of design rules are corrected after the violations come into existence such that a post-completion checking is made for compliance with design rules, some of which are design rules. More particularly, regarding post-completion checking, it is only after the initial completion of a layout diagram that a determination is made whether the layout diagram complies with a design rule which relates to a non-circular group (among other rules). Such post-completion checking typically identifies a large number of violations of design rules and a corresponding large number of corrections which need to be made to non-circular groups and/or cyclic groups. Moreover, some of the design rule violations discovered during post-completion checking are consequential design rule violations which arise because of (or as a consequence of) the existence of one or more other violations of design rules. In contrast, in some embodiments, pre-completion checking reduces (if not prevents) violations of design rules before the initial completion of the layout diagram, with a beneficial result being that there are fewer (if any) violations of design rules which need to be corrected after the initial completion of the layout diagram.

In some embodiments, for an intra-row non-circular group which includes two cut patterns each of which abuts the same boundary of the same row, a first example of a corresponding design rule is that a total number of cut patterns in the intra-row non-circular group must be odd. Determining compliance with the first design rule includes: identifying that each of first and second ones of the given cut pattern and the one or more other cut patterns in the non-circular group (which represent corresponding first and second border patterns) abuts a same one of the first and second boundaries of the row; and identifying that a tally of the cut patterns in the non-circular group is an odd number. But if the tally is even, then there is a violation of the first design rule.

In some embodiments, for an intra-row non-circular group which includes two cut patterns which abut opposite boundaries of the same row, a second example of a corresponding design rule is that a total number of cut patterns in the intra-row non-circular group must be even. Determining compliance with the second design rule includes: identifying that first and second ones of the given cut pattern and the one or more other cut patterns in the non-circular group, (which represent corresponding first and second border patterns) correspondingly abut the first and second boundaries of the row; and identifying that a tally of the cut patterns in the non-circular group is an even number. But if the tally is odd, then there is a violation of the second design rule.

In some embodiments, a third example of a design rule is that a total number of cut patterns in a multi-row cyclic group must be even. Determining compliance with the third design rule includes: identifying that the given cut pattern and the one or more other cut patterns in the cyclic group are dispersed across the rows such that the cyclic group is multi-row cyclic group; and identifying that a tally of the cut patterns in the cyclic group is an even number. But if the tally is odd, then there is a violation of the third design rule.

FIG. 1 is a block diagram of a semiconductor device 100 in accordance with at least one embodiment of the present disclosure.

In FIG. 1, semiconductor device 100 includes, among other things, a circuit macro (hereinafter, macro) 102. In some embodiments, macro 102 is an SRAM macro. In some embodiments, macro 102 is a macro other than an SRAM macro. Macro 102 includes, among other things, a wire routing arrangement 104. Examples of layout diagrams resulting in wire routing arrangement 104 include the layout diagrams in each of each of FIGS. 2A, 2B, 3A, 4A, 5, 6 and 7.

Figure 2A:
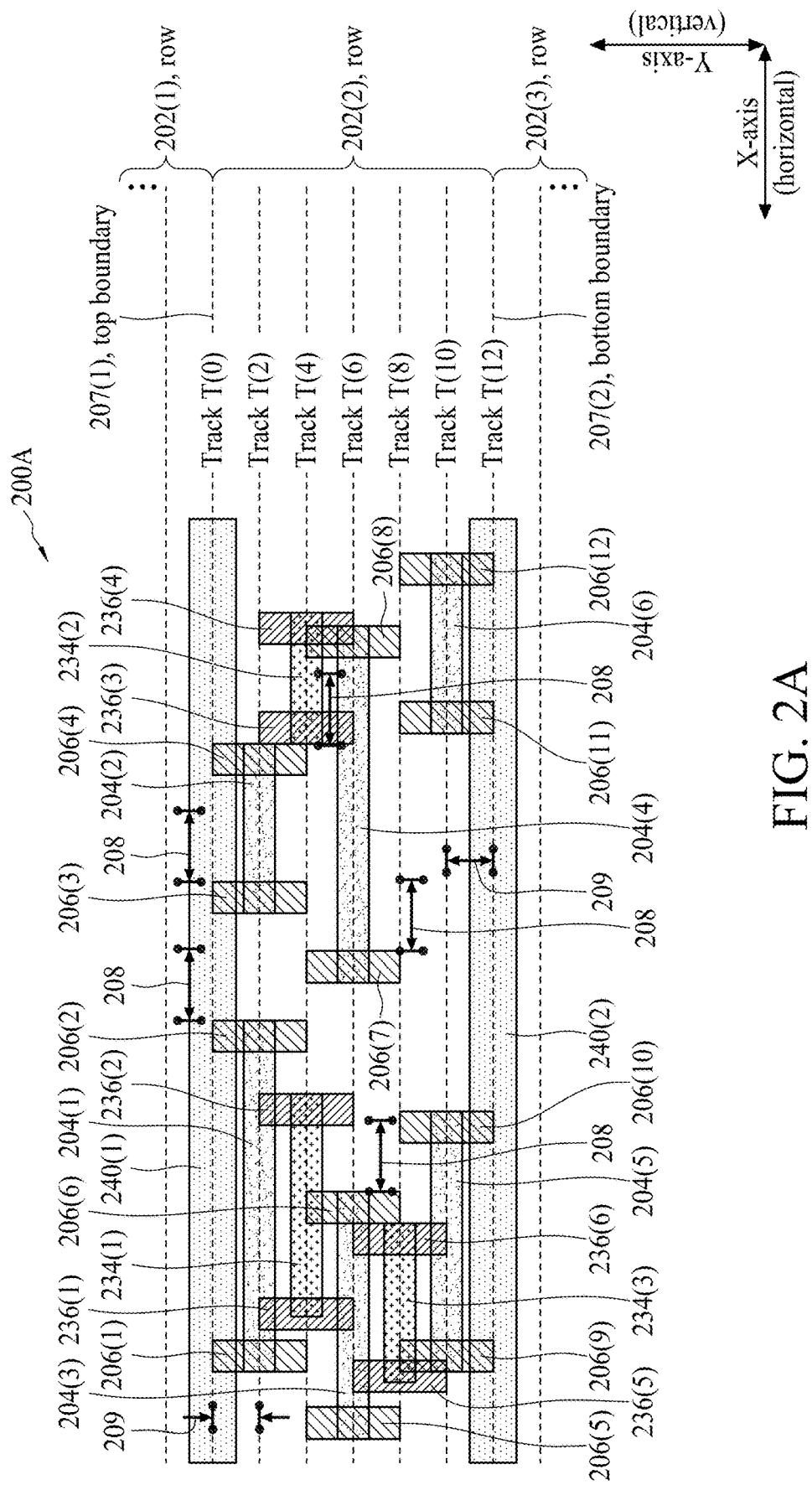
FIG. 2A is a layout diagram of a wire routing arrangement, in accordance with some embodiments.

FIG. 2A is a layout diagram 200A of a wire routing arrangement, in accordance with some embodiments.

Among other things, FIG. 2A shows cut patterns and corresponding conductive patterns, all of which are included in layout diagram 200A, as discussed below.

An example of a semiconductor device having been fabricated based on a larger layout diagram which includes layout diagram 200A of FIG. 2A is semiconductor device 100 of FIG. 1, where one routing arrangement 104 corresponds to layout diagram 200A.

In FIG. 2A, layout diagram 200A is organized into rows, each row extending in a first direction. In some embodiments, the first direction is the horizontal direction. In some embodiments, the first direction is a direction other than horizontal. For simplicity of illustration, layout diagram 200A includes three rows 202(1), 202(2) and 202(3). In some embodiments, layout diagram 200A includes a number or rows other than three. Each of rows 202(1), 202(2) and 202(3) is arranged in a grid-like manner which includes a predetermined number of tracks, each track extending in the horizontal direction. For a semiconductor device based on a layout diagram, the spacing between tracks reflects a minimum separation between corresponding conductors, and is dependent on the corresponding process/technology node. For simplicity of discussion, layout diagram 200A assumes that each of rows 202(1), 202(2) and 202(3) includes twelve tracks. For simplicity of illustration, layout diagram 200A shows six of the twelve tracks, namely T(0), T(2), T(4), T(6), T(8), T(10) and T(12). In some embodiments, each row is organized with a number of tracks other than twelve. In FIG. 2A, for simplicity of illustration, an example of the track pitch (the spacing between immediately adjacent tracks) is shown as distance 209.

Relative to a second direction which is substantially perpendicular to the first direction, each row has first and second boundaries. To further the example of FIG. 2A, the second direction is the vertical direction. In some embodiments, the second direction is a direction other than vertical. In some embodiments, the first and second boundaries of each row correspond to the top and bottom boundaries of the row. In row 202(2), the top boundary is substantially collinear with track T(0) and the bottom boundary is substantially collinear with track T(12).

Layout diagram 200A of FIG. 2A includes conductive patterns 204(1)-204(6) and 234(1)-234(3), each of which represents a corresponding conductor in a given layer of metallization. Long axes of conductive patterns 204(1)-204(6) and 234(1)-234(3) are substantially parallel to the first direction.

In some embodiments, the given layer represents a first layer of metallization, M_1st, in a semiconductor device having been fabricated based on a larger layout diagram which includes a smaller layout diagram, e.g., layout diagram 200A of FIG. 2A. In some embodiments, depending upon the numbering convention of the corresponding process/technology node by which such a semiconductor device is fabricated, the first (1st) layer of metallization M_1st is either metallization layer zero, M0, or metallization layer one, M1. In some embodiments, the given layer of metallization is a layer above M_1st.

FIG. 2A assumes a context in which multi-patterning lithography is used. In particular, FIG. 2A assumes the use of double patterning lithography (DPL). In some embodiments, multi-patterning lithography other than DPL is used. DPL is a layout splitting method analogous to a two coloring problem for layout splitting in graph theory. In some embodiments, polygons in a layout diagram, e.g., conductive patterns, and their spatial relationships to each other are modeled with corresponding vertices and edges in a graph. Typically, two adjacent vertices connected with an edge are assigned different colors. In a DPL context, two color types are assigned. For example, regarding a given metallization layer in a layout diagram, each conductive pattern in the metallization layer is assigned the first color or second color. During fabrication based on the layout diagram, conductive patterns of the first color are formed by a first mask, and conductive patterns of the second color are formed by a second mask.

In some embodiments, during fabrication, a 'cutback' technique is used in which: a conductive structure is formed along substantially an entirety of a track; and subsequently, portions of the conductive structure are removed, resulting in one or more conductors which are substantially collinear with the given track. In some embodiments, the cutback technique is indicated in a layout diagram by disposing cut patterns over corresponding ends of conductive patterns. In some embodiments, similar to the use of different colors to denote the different masks of multi-patterning lithography, cut masks are shown with different colors corresponding to the different colors of the conductive patterns.

In layout diagram 200A, for simplicity of illustration, conductive patterns 204(1), 204(2), 204(3), 204(4), 204(5) and 204(6) are associated with a first color, e.g., orange, and conductive patterns 234(1), 234(2) and 234(3) are associated with a second color, e.g., brown. In some embodiments, other numbers of conductive patterns are contemplated. In some embodiments, other groupings of conductive patterns with respect to the first and second colors are contemplated.

Layout diagram 200A further includes cut patterns 206 (1)-206(12) and 236(1)-236(6). Short axes of cut patterns 206(1)-206(12) and 236(1)-236(6) are substantially parallel to the vertical direction, while long axes thereof are substantially parallel to the horizontal direction. Cut patterns 206(1)-206(12), which are associated with corresponding conductive patterns 204(1), 204(2), 204(3), 204(2), 204(5) and 204(6), are assigned a third color, e.g., green. Cut patterns 206(1)-206(12) indicate that any portion of conductive patterns 204(1)-204(6) correspondingly lying thereunder will be cut. Cut patterns 236(1)-236(6), which are associated with conductive patterns 234(1), 234(2) and 234(3), are assigned a fourth color, e.g., pink. Cut patterns 236(1)-236(6) indicate that any portion of conductive patterns 234(1)-234(3) correspondingly lying thereunder will be cut. Cut patterns 236(1)-236(6) indicate that any portion of conductive patterns 234(1)-234(3) correspondingly lying thereunder will be cut. Cut patterns 206(1)-206(12) have no cut effect with respect to conductive patterns 234(1)-234(3). Cut patterns 236(1)-236(6) have no cut effect with respect to conductive patterns 204(1)-204(6).

More particularly, cut patterns 206(1) and 2060 are disposed over corresponding ends of conductive pattern 204(1). Cut patterns 206(3) and 206(4) are disposed over corresponding ends of conductive pattern 204(2). Cut patterns 206(5) and 206(6) are disposed over corresponding ends of conductive pattern 204(3). Cut patterns 206(7) and 206(8) are disposed over corresponding ends of conductive pattern 204(4). Cut patterns 206(9) and 206(3) are disposed over corresponding ends of conductive pattern 204(5). Cut patterns 206(11) and 206(12) are disposed over corresponding ends of conductive pattern 204(6). Cut patterns 236(1) and 236(2) are disposed over corresponding ends of conductive pattern 234(1). Cut patterns 236(3) and 236(4) are disposed over corresponding ends of conductive pattern 234(2). Cut patterns 236(5) and 236(6) are disposed over corresponding ends of conductive pattern 234(3).

Layout diagrams are generated in a context of design rules including some which relate to non-circular groups and/or cyclic groups. In some embodiments, a non-circular group is referred to as a GO group. In some embodiments, a cyclic group is referred to as a GO loop. A fourth example of a design rule is a minimum spacing between conductive patterns. A fifth example of a design rule is a minimum spacing between cut patterns. In FIG. 2A, for simplicity of illustration, an example of the minimum spacing between cut patterns is shown as distance 208. For simplicity, in FIG. 2A, distance 208 is shown as being parallel to the horizontal direction. However, distance 208 is not limited to having a horizontal orientation. Rather, distance 208 can have any orientation, e.g., parallel to the vertical direction, or otherwise. Such minimum spacing is dependent on the process/ technology node by which will be fabricated a semiconductor device based on a layout diagram. Consider an example of a problematic situation in which a first pattern and a second pattern, e.g., a first cut pattern and a second cut pattern, are located so closely together that they violate the fifth design rule (minimum spacing between cut patterns), as such the first and second cut patterns should not be implemented by the same mask and thus should not be assigned the same color. In terms of graph theory, such first and second cut patterns comprise corresponding first and second members of a non-circular group. The first cut pattern (member/node) of the non-circular group is 'connected' in the graph to the second cut pattern (member/mode). Each non-circular group includes two or more members/nodes. Each member of a non-circular group has at least one edge 'connecting' (in terms of a graph) it to another member of the non-circular group. Each interior member of a non-circular group has at least two edges connecting it to at least two other members of the non-circular group. Terminating members of a non-circular group have one edge connecting the terminating member to another member of the non-circular group, which typically is an interior member.

In some circumstances, a non-circular group is circular in that each member of the non-circular group has at least two edges connecting it to two other members of the group. Herein, a non-circular group which is circular is referred to as a cyclic group. A multi-row cyclic group includes two or more non-circular groups. Cyclic groups are discussed in more detail below in the context of FIGS. 5-6. In terms of graph theory, and in a context of DPL, a design rule, e.g., the third design rule, is violated when a cyclic group includes an odd number of members. Accordingly, one or more corrections are made to the layout diagram, and more particularly to one or more spatial relationships in the cyclic group, in order to not violate the design rule.

Layout diagram 200A further includes conductive patterns 240(1) and 240(2). In some embodiments, conductive patterns 240(1) and 240(2) represent corresponding conductors in a power grid (PG conductors) of a semiconductor device fabricated a semiconductor device based on a layout diagram 200A. In some embodiments, conductive pattern 240(1) represents a PG conductor having a first reference voltage and conductive pattern 240(2) represents a PG conductor having a second reference voltage. In some embodiments, the first and second reference voltages are correspondingly VDD and VSS.

Figure 2B:
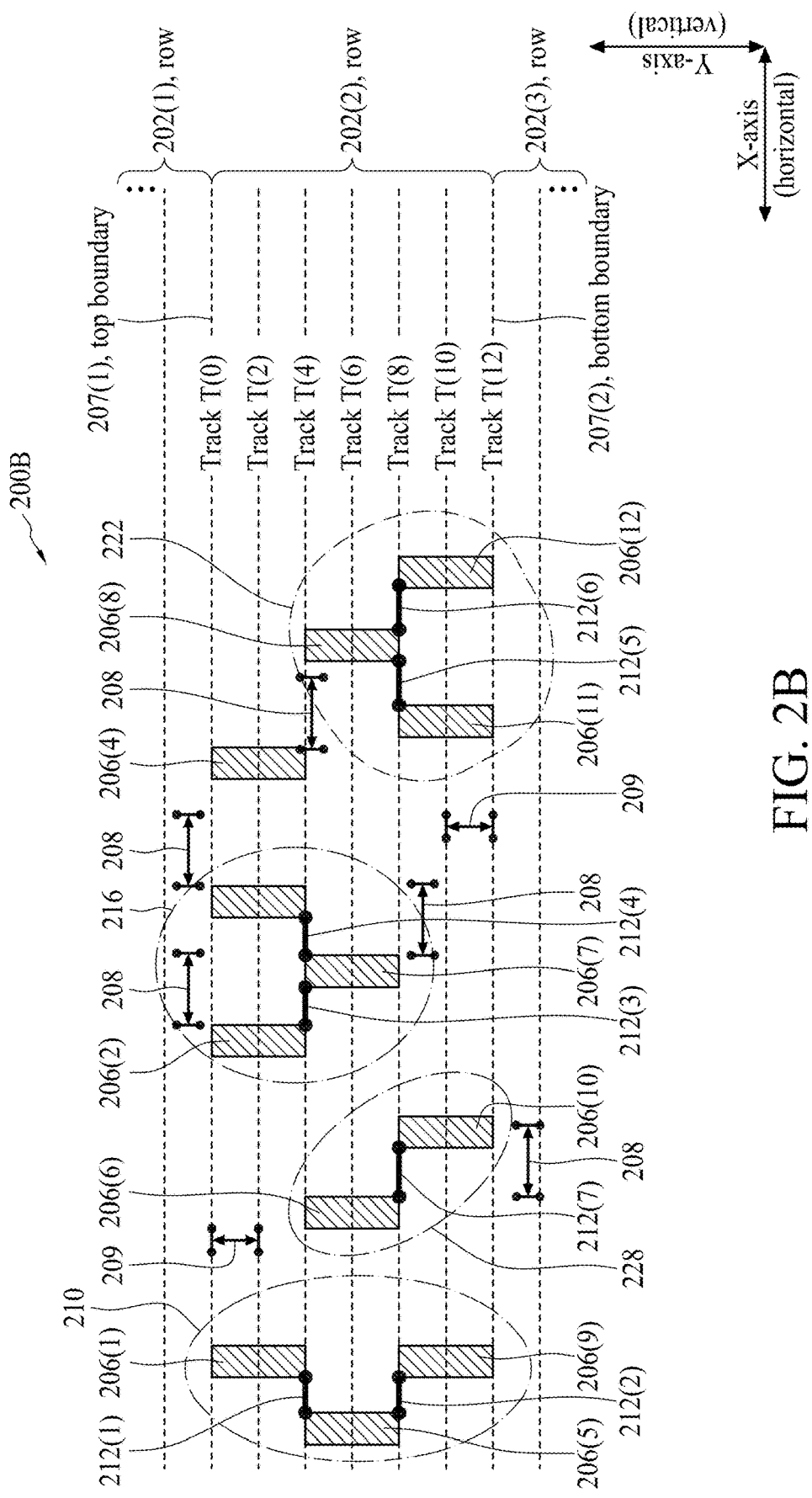
FIG. 2B is a layout diagram of a wire routing arrangement, in accordance with some embodiments.

FIG. 2B is a layout diagram 200B of a wire routing arrangement, in accordance with some embodiments.

Among other things, FIG. 2B shows non-circular groups and cut patterns correspondingly included therein, all of which are included in layout diagram 200B, as discussed below.

In FIG. 2B, for simplicity of discussion (and illustration), conductive patterns 234(1)-234(3), cut patterns 236(1)-236(6) and conductive patterns 240(1)-240(2) of layout diagram 200A have been removed from layout diagram 200B. As an addition relative to layout 200A of FIG. 2A, non-circular groups are indicated in layout diagram 200B of FIG. 2B, namely non-circular groups 210, 216, 222 and 228.

non-circular group 210 includes cut patterns 206(1), 206(5) and 206(9) as members. Short axes of symmetry of cut patterns 206(1), 206(5) and 206(9) are substantially aligned with corresponding tracks of row 202(2) such that non-circular group 210 is an intra-row non-circular group. In non-circular group 210, cut patterns 206(1) and 206(5) are connected by an edge 212(1), and cut patterns 206(5) and 206(9) are connected by an edge 212(2). As such, in non-circular group 210, cut pattern 206(5) also is referred to as an interior pattern, and cut patterns 206(1) and 206(9) also are referred to as terminating patterns.

non-circular group 216 includes cut patterns 2060, 206(3) and 206(7) as members. Short axes of symmetry of cut patterns 2060, 206(3) and 206(7) are substantially aligned with corresponding tracks of row 202(2) such that non-circular group 210 is an intra-row non-circular group. In non-circular group 216, cut patterns 2060 and 206(7) are connected by an edge 212(3), and cut patterns 206(7) and 206(3) are connected by an edge 212(4). As such, in non-circular group 216, cut pattern 206(7) also is referred to as an interior pattern, and cut patterns 206(2) and 206(3) also are referred to as terminating patterns.

non-circular group 222 includes cut patterns 206(8), 206(11) and 206(12) as members. Short axes of symmetry of cut patterns 206(8), 206(11) and 206(12) are substantially aligned with corresponding tracks of row 202(2) such that non-circular group 210 is an intra-row non-circular group. In non-circular group 222, cut patterns 206(11) and 206(8) are connected by an edge 212(5), and cut patterns 206(8) and 206(12) are connected by an edge 212(6). As such, in non-circular group 222, cut pattern 206(8) also is referred to as an interior pattern, and cut patterns 206(11) and 206(12) also are referred to as terminating patterns.

non-circular group 228 includes cut patterns 206(6) and 206(11) as members. Short axes of symmetry of cut patterns 206(6) and 206(11) are substantially aligned with corresponding tracks of row 202(2) such that non-circular group 210 is an intra-row non-circular group. In non-circular group 228, cut patterns 206(6) and 206(11) are connected by an edge 212(7). As such, cut patterns 206(1) and 206(9) also are referred to as terminating patterns. As non-circular group 228 does not include a cut pattern that has at least two edges connecting it to at least two other cut patterns of non-circular group 228, it is noted that non-circular group 228 does not include a cut pattern which would be referred to as an interior pattern.

Recalling that a cyclic group includes two or more non-circular groups, for purposes of pre-completion checking (for design rule violations), at least some embodiments take into consideration certain types of non-circular groups, namely non-circular groups which include at least two cut patterns which abut corresponding boundaries of the same row.

Within the context of a non-circular group, a cut pattern which abuts a boundary of a row also is referred to as a border pattern. Examples of non-circular groups which include at least two border patterns which abut corresponding boundaries of the same row include non-circular groups 210, 216 and 222 of layout diagram 200B.

Regarding non-circular group 210, cut patterns 206(1) and 206(9) also are referred to as border patterns. Recalling that the top boundary of row 202(2) is substantially collinear with track T(0), cut pattern 206(1) of non-circular group 210 abuts the top boundary of row 202(2) and so cut pattern 206(1) is also referred to as border pattern 206(1). Recalling that the bottom boundary of row 202(2) is substantially collinear with track T(12), cut pattern 206(9) of non-circular group 210 abuts the bottom boundary of row 202(2) and so cut pattern 206(9) is also referred to as border pattern 206(9). Accordingly, non-circular group 210 is more specifically an example of a non-circular group that includes two cut/border patterns which abut corresponding opposite boundaries (here, corresponding top and bottom boundaries) of the same row.

Regarding non-circular group 216, cut patterns 2060 and 206(3) also are referred to as border patterns. Recalling that the top boundary of row 202(2) is substantially collinear with track T(0), each of cut patterns 2060 and 206(3) of non-circular group 216 abuts the top boundary of row 202(2) and so cut patterns 2060 and 206(3) are also correspondingly referred to as border patterns 2060 and 206(3). Accordingly, non-circular group 216 is more specifically an example of a non-circular group that includes two cut/border patterns each of which abut the same boundary (here, the top boundary) of the same row.

Regarding non-circular group 222, cut patterns 206(11) and 206(12) also are referred to as border patterns. Recalling that the bottom boundary of row 202(2) is substantially collinear with track T(12), each of cut patterns 206(11) and 206(12) of non-circular group 222 abuts the bottom boundary of row 202(2) and so cut patterns 206(11) and 206(12) are also correspondingly referred to as border patterns 206(11) and 206(12). Accordingly, non-circular group 222 is more specifically an example of a non-circular group that includes two cut/border patterns each of which abut the same boundary (here, the bottom boundary) of the same row.

It is noted that not all non-circular groups necessarily include at least two cut patterns which abut corresponding boundaries of the same row. An example of such a non-circular group is non-circular group 228. Only one of the two cut patterns in non-circular group 228 abuts a boundary of row 202(2). Recalling that the bottom boundary of row 202(2) is substantially collinear with track T(12), cut pattern 206(11) abuts the bottom boundary of row 202(2) and so cut pattern 206(11) is also referred to as border pattern 206(11). The other cut pattern in non-circular group 228, namely cut pattern 206(6) does not abut either the top or bottom boundary of row 202(2).

In some embodiments, one or more non-circular groups do not include any two cut patterns which abut a boundary of the row in which the non-circular group is located. For simplicity of illustration, such a group (namely, a non-circular group that does not include any two cut patterns which abut a boundary of the row in which the non-circular group is located) is not shown in FIG. 2B.

Figure 3A:
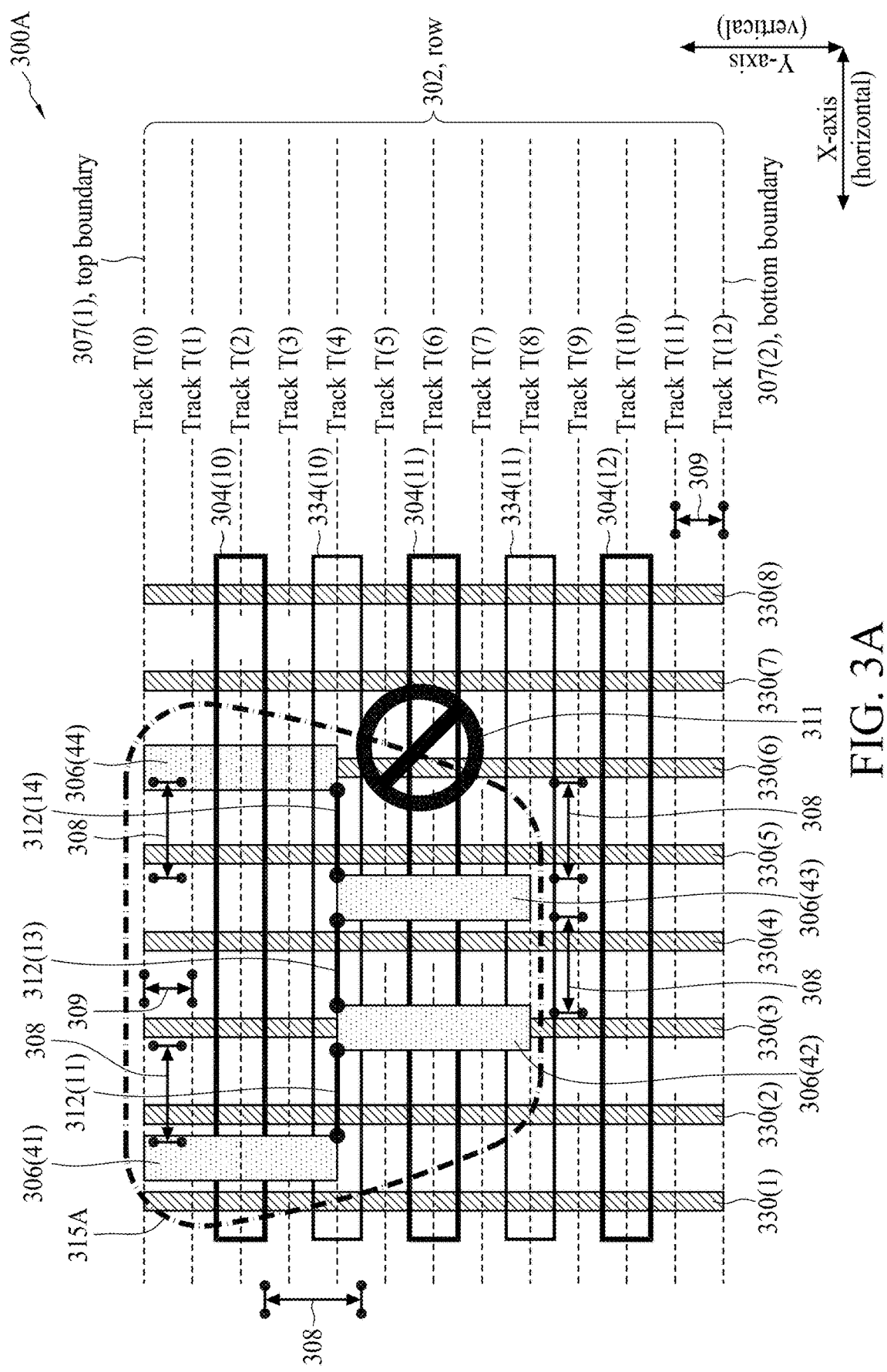
FIG. 3A is a layout diagram of a wire routing arrangement, in accordance with some embodiments.

FIG. 3A is a layout diagram 300A of a wire routing arrangement, in accordance with some embodiments.

Among other things, FIG. 3A provides context for the first design rule, e.g., by showing the placement of a given cut pattern in a candidate location of layout diagram 300A which not only would result in the formation of a non-circular group, but also to result in the formation of a non-circular group which violates the first design rule, as discussed below.

Layout diagram 300A of FIG. 3A is similar to layout diagrams 200A and 200B of corresponding FIGS. 2A and 2B.

For brevity, the discussion of layout diagram 300A will focus on differences of layout diagram 300A with respect to layout diagrams 200A and 200B. An element in FIG. 3A which is similar to an element in FIGS. 2A and/or 2B has a 3-series number in FIG. 3A whereas the corresponding element(s) in FIGS. 2A and/or 2B has a 2-series number. Differences between otherwise similar elements are noted by different parenthetical numbers. For example, elements 204(1) in layout 200A of FIG. 2A and element 304(41) are similar in that both are conductive patterns associated with the orange color. In some embodiments, conductive pattern 304(1) as well as conductive patterns 304(11)-304(12) and 334(10)-334(11) are located in the same layer of metallization as conductive patterns 204(1)-204(6) and 234(1)-234(3) would be located. But element 204(1) in layout 200A has a different length in the horizontal direction than element 304(41) in layout 300A, plus element 204(1) in layout 200A has a different position along track T(2) than element 304(41) in layout diagram 300A. Hence, element 204(1) in layout 200A has a different parenthetical number (namely, 1) than the parenthetical number (namely 41) of element 304(41) in layout diagram 300A.

In FIG. 3A, for simplicity of discussion (and illustration), no conductive patterns are shown which would be similar to conductive patterns 234(1)-234(3) of layout diagram 200A, nor cut patterns which would be similar to cut patterns 236(1)-236(6) of layout diagram 200A, nor conductive patterns which would be similar to conductive patterns 240(1)-240(2) of layout diagram 200A, nor rows which would be similar to rows 202(1) and 202(3) of each of layout diagrams 200A and 200B. As an addition relative to layout diagrams 200A and 200B of corresponding FIGS. 2A-2B, gate patterns 330(1), 330(2), 330(3), 330(4), 330(5), 330(6), 330(7) and 330(8) have been added to layout diagram 300A of FIG. 3A.

Layout diagram 300A of FIG. 3A includes cut patterns 306(41), 306(42), 306(43) and 306(44). Cut patterns 306(41)-306(44) are similar to cut patterns 206(1)-206(12) of layout diagrams 200A-200B of corresponding FIGS. 2A-2B, e.g., in terms having been assigned the same color, e.g., such that the former is associated with corresponding conductive patterns conductive patterns 304(10)-304(12) and the latter is associated with corresponding conductive patterns cut patterns 204(1)-204(6). In contrast to cut patterns 204(1)-204(6), cut patterns 306(41)-306(44) have different placements along corresponding tracks T(0)-T(12), as reflected in cut patterns 306(41)-306(44) having different parenthetical values than otherwise similar cut patterns 204(1)-204(6).

Cut pattern 306(41) is located over conductive pattern 304(10) and between (relative to the horizontal direction) gate patterns 330(1) and 330(2). Cut pattern 306(42) is located over conductive pattern 304(11) and between (relative to the horizontal direction) gate patterns 330(2) and 330(3). Cut pattern 306(43) is located over conductive pattern 304(11) and between (relative to the horizontal direction) gate patterns 330(4) and 330(5). Cut pattern 306(45) is located over conductive pattern 304(10) and over (relative to the horizontal direction) gate patterns 330(6).

In layout diagram 300A, a non-circular group 315A is indicated. non-circular group 315A includes cut patterns 306(41)-306(45) as members. Short axes of symmetry of cut patterns 306(41)-306(44) are substantially aligned with corresponding tracks T(2) and T(6) of row 302 such that non-circular group 315A is an intra-row non-circular group. In non-circular group 315A, cut patterns 306(41) and 306(42) are connected by an edge 312(11), cut patterns 306(42) and 306(43) are connected by an edge 312(13), and cut patterns 306(43) and 306(44) are connected by an edge 312(14). As such, in non-circular group 315A, cut patterns 306(42) and 306(43) also are referred to as interior patterns, and cut patterns 306(41) and 306(44) also are referred to as terminating patterns.

Regarding non-circular group 315A, cut patterns 306(41) and 306(44) also are referred to as border patterns. The top boundary of row 302 is substantially collinear with track T(0) such that each of cut patterns 306(41) and 306(44) of non-circular group 315A abuts the top boundary of row 302 and so cut patterns 306(41) and 306(44) are also correspondingly referred to as border patterns 306(41) and 306(44). Accordingly, non-circular group 315A is an example of a non-circular group which includes two cut patterns which abut the same boundary of the same row. More particularly, non-circular group 315A is an example of a non-circular group that includes two cut/border patterns (namely, cut patterns 306(41) and 306(44)) each of which abuts the top boundary of the same row (namely row 302).

For purposes of pre-completion checking (for design rule violations) in a multi-patterning context, at least some embodiments treat multi-row cyclic groups as being comprised of non-circular groups, and pre-completion checking is applied to non-circular groups. At least some embodiments take into consideration non-circular groups such as non-circular group 315A in the context of a design rule, e.g., the first design rule. Again, the first design rule is directed to an intra-row non-circular group in which each of first and second ones of the cut patterns in the non-circular group are corresponding first and second border patterns abutting a same one of first and second boundaries of the row, and requires that a total number of cut patterns in the non-circular group must be odd. In some embodiments, one or more other design rules are contemplated. Additional information regarding non-circular group and/or cyclic group spaces and/or associated design rules is found in U.S. Pat. No. 8,239,806, granted Aug. 7, 2012, and in U.S. Pat. No. 8,365,102, granted Jan. 29, 2013, the entireties of each of which are hereby incorporated by reference.

For purposes of discussion, a sequence of placement will be assumed in which cut patterns 306(41)-306(43) were placed in layout diagram 300A before the placement of cut pattern 306(44). In some embodiments, the sequences of placement are different. In some embodiments, upon attempting to place cut pattern 306(44) in the candidate location, namely over conductive pattern 304(1) and over (relative to the horizontal direction) gate pattern 330(6), a determination is made whether the candidate location would result not only in at least one of a non-circular group or a cyclic group but in at least one of a non-circular group or a cyclic group which would violate the first design rule. If so, then placement of cut pattern 306(44) in the candidate location would be prevented temporarily until a correction was made which avoids violating the first design rule.

In the example of FIG. 3A, the placement of cut pattern 306(44) in the candidate location is determined not only to result in the formation of a non-circular group (namely, non-circular group 315A), but also to result in the formation of a non-circular group which violates the first design rule. The first design rule is violated, as indicated by circle-backslash symbol 311, because a total number of cut patterns in non-circular group 315A is an even number (here, 4). Hence, placement of cut pattern 306(44) in the candidate location is prevented temporarily until a correction was made which avoids violating the first design rule. In contrast, an example of a non-circular group which does not violate the first design rule is provided by FIG. 3B, discussed below.

In FIG. 3A, gate patterns 330(1), 330(2), 330(3), 330(4), 330(5), 330(6), 330(7) and 330(8) represent corresponding gate electrodes in a semiconductor device having been fabricated based on a larger layout diagram which includes a smaller layout diagram, e.g., layout diagram 300A of FIG. 3A. Long axes of gate patterns 330(1), 330(2), 330(3), 330(4), 330(5), 330(6), 330(7) and 330(8)204(1)-204(6) and 234(1)-234(3) are substantially perpendicular to long axes of conductive patterns 304(10)-304(12) and 334(10)-334(11). In some embodiments, gate patterns 330(1), 330(2), 330(3), 330(4), 330(5), 330(6), 330(7) and 330(8) are located under conductive patterns 304(10)-304(12) and 334(10)-334(11).

Figure 3B:
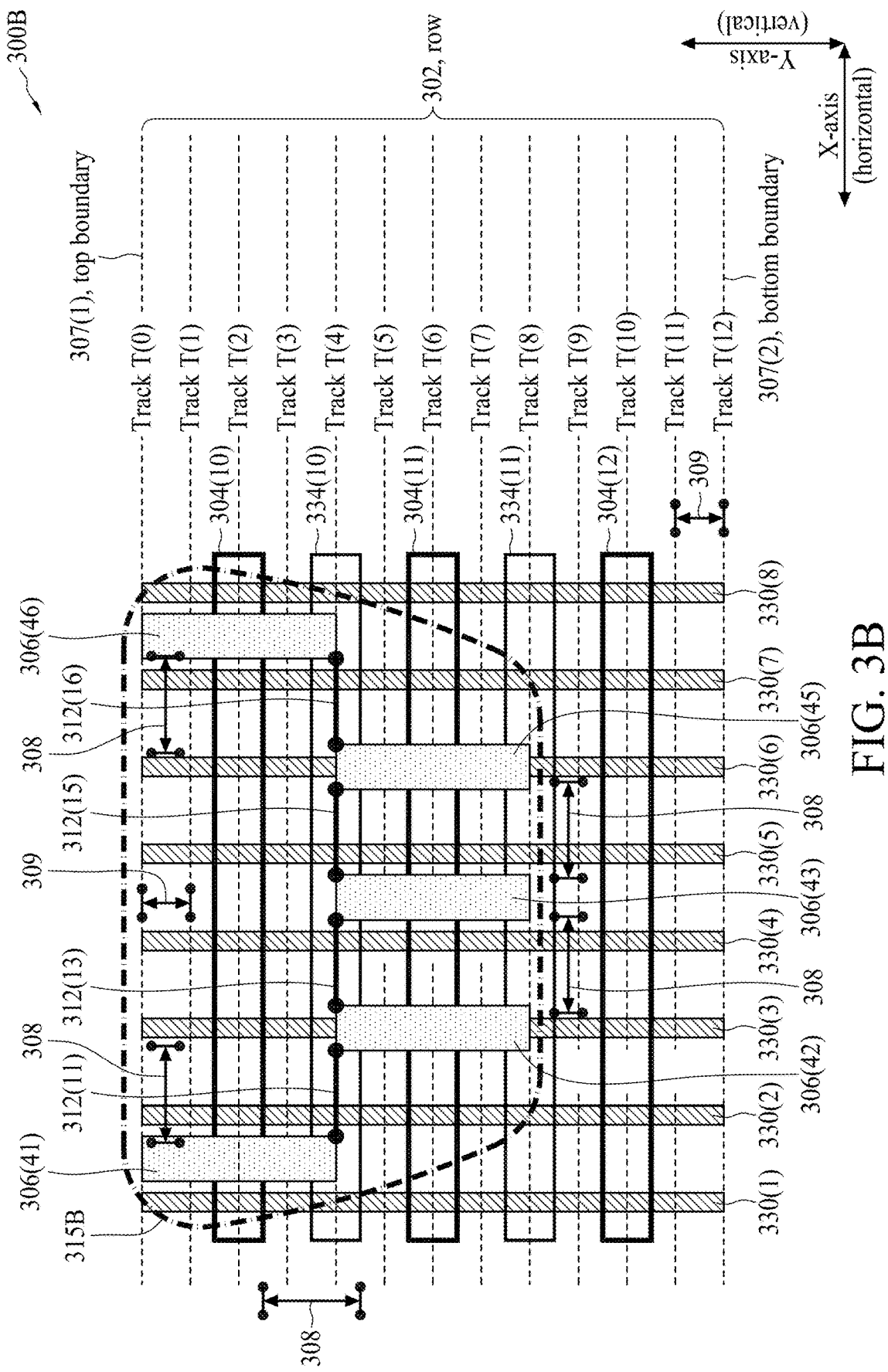
FIG. 3B is a layout diagram of a wire routing arrangement, in accordance with some embodiments.

FIG. 3B is a layout diagram 300B of a wire routing arrangement, in accordance with some embodiments.

Among other things, FIG. 3B provides context for the first design rule, e.g., by showing the placement of a given cut pattern in a candidate location in layout diagram 300B which would result in the formation of a non-circular group but which does not violate the first design rule, as discussed below.

Layout diagram 300B of FIG. 3B is similar to layout diagram 300A of FIG. 3A. An example of a semiconductor device having been fabricated based on a larger layout diagram which includes layout diagram 300A of FIG. 3A is semiconductor device 100 of FIG. 1, where one routing arrangement 104 corresponds to layout diagram 300A.

For brevity, the discussion of layout diagram 300B will focus on differences of layout diagram 300B with respect to layout diagram 300A.

Layout diagram 300B of FIG. 3B omits cut-pattern 306(44) and adds cut patterns 306(45) and 306(46) relative to layout diagram 300A of FIG. 3A. Cut pattern 306(45) is located over conductive pattern 304(11) and over (relative to the horizontal direction) gate pattern 330(6). Cut pattern 306(46) is located over conductive pattern 304(10) and between (relative to the horizontal direction) gate patterns 330(7) and 330(8). Cut patterns 306(43) and 306(45) are connected by an edge 312(15). Cut patterns 306(45) and 306(46) are connected by an edge 312(16).

In layout diagram 300B, a non-circular group 315B is indicated. non-circular group 315B includes cut patterns 306(41)-306(43) and 306(44)-306(45) as members. Short axes of symmetry of cut patterns 306(41)-306(43) and 306(45)-306(46) are substantially aligned with corresponding tracks T(2) and T(6) of row 302 such that non-circular group 315B is an intra-row non-circular group. In non-circular group 315A, cut patterns 306(42), 306(43) and 306(45) also are referred to as interior patterns, and cut patterns 306(41) and 306(46) also are referred to as terminating patterns. Cut patterns 306(41) and 306(46) also are referred to as border patterns. The top boundary of row 302 is substantially collinear with track T(0) such that each of cut patterns 306(41) and 306(46) of non-circular group 315B abuts the top boundary of row 302 and so cut patterns 306(41) and 306(46) are also correspondingly referred to as border patterns 306(41) and 306(46). Accordingly, non-circular group 315B is an example of a non-circular group which includes two cut patterns which abut the same boundary of the same row. More particularly, non-circular group 315B is an example of a non-circular group that includes two cut/border patterns (namely, cut patterns 306(41) and 306 (46)) each of which abuts the top boundary of the same row (namely row 302).

For purposes of pre-completion checking (for design rule violations) in a multi-patterning context, at least some embodiments treat multi-row cyclic groups as being comprised of non-circular groups, and pre-completion checking is applied to non-circular groups. At least some embodiments take into consideration non-circular groups such as non-circular group 315A in the context of a design rule, e.g., the first design rule which (again) requires that a total number of cut patterns in an intra-row non-circular group must be odd. In some embodiments, one or more other design rules are contemplated.

For purposes of discussion, a sequence of placement will be assumed in which cut patterns 306(41)-306(43) and 306(45) were placed in layout diagram 300B before the placement of cut pattern 306(46). In some embodiments, the sequences of placement are different. In some embodiments, upon attempting to place cut pattern 306(46) in the candidate location, namely over conductive pattern 304(1) and between (relative to the horizontal direction) gate patterns 330(7) and 330(8), a determination is made whether the candidate location would result not only in at least one of a non-circular group or a cyclic group but in at least one of a non-circular group or a cyclic group which would violate the first design rule. If so, then placement of cut pattern 306(46) in the candidate location would be prevented temporarily until a correction was made which avoids violating the first design rule.

In the example of FIG. 3B, the placement of cut pattern 306(46) in the candidate location is determined to result in a non-circular group (namely, non-circular group 315B), but also is determined to not result in the formation of a non-circular group which violates the first design rule. Though non-circular group 315B is an example of a non-circular group which includes at least two cut patterns (again, cut patterns 306(41) and 306(46)) which abut corresponding boundaries of the same row, the first design rule is not violated because a total number of cut patterns in non-circular group 315B is an odd number (here, 5).

Figure 4A:
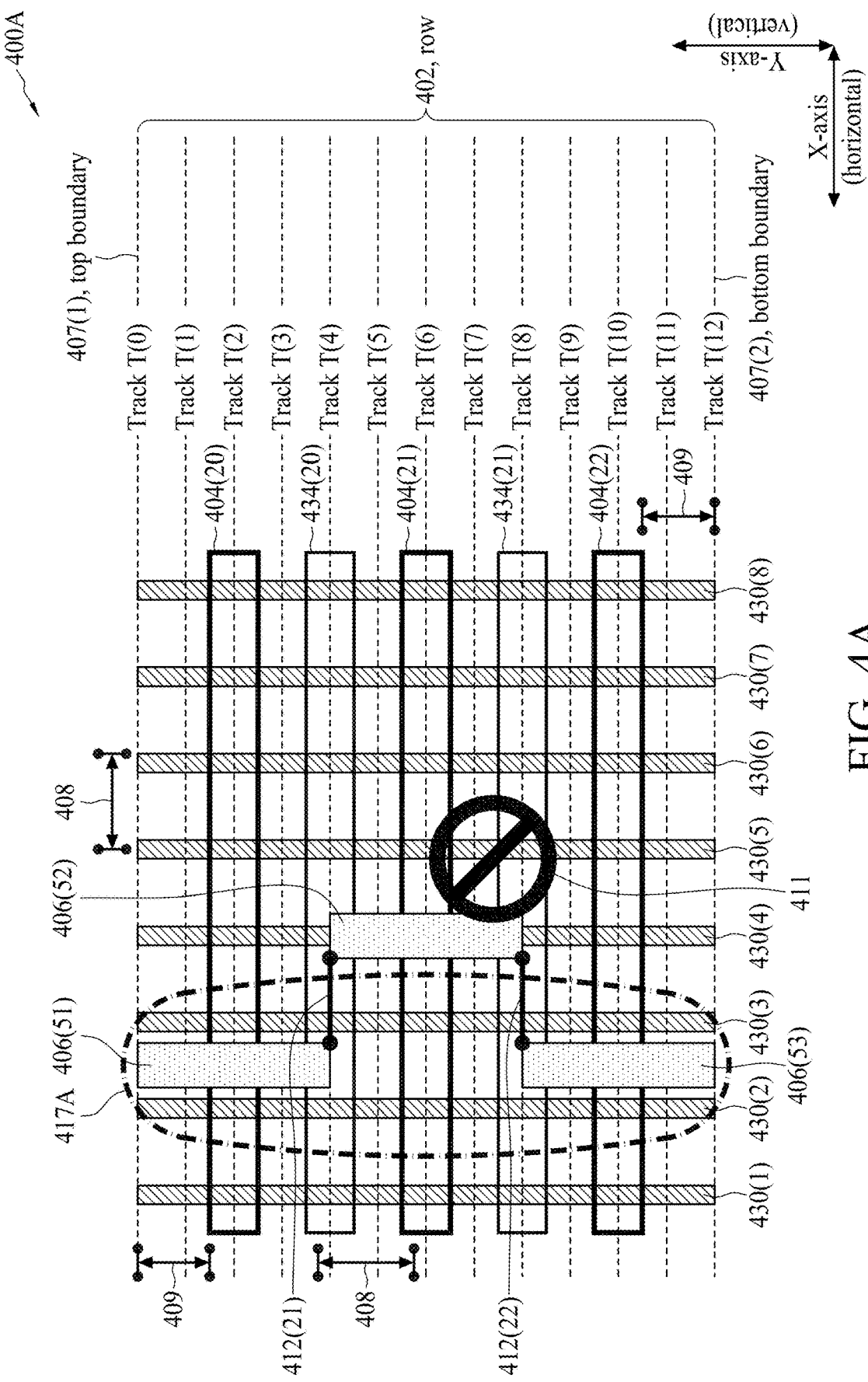
FIG. 4A is a layout diagram of a wire routing arrangement, in accordance with some embodiments.

FIG. 4A is a layout diagram 400A of a wire routing arrangement, in accordance with some embodiments.

Among other things, FIG. 4A provides context for the second design rule, e.g., by showing the placement of a given cut pattern in a candidate location of layout diagram 400A which not only would result in the formation of a non-circular group, but also to result in the formation of a non-circular group which violates the second design rule, as discussed below.

Layout diagram 400A of FIG. 4A is similar to layout diagram 300A of FIG. 3A. For brevity, the discussion of layout diagram 300B will focus on differences of layout diagram 400A with respect to layout diagram 300A.

In FIG. 4A, layout diagram 400A includes cut patterns 406(51), 406(42), 406(43) and 406(44). Cut pattern 406(51) is located over conductive pattern 404(20) and between (relative to the horizontal direction) gate patterns 430(2) and 430(3). Cut pattern 406(52) is located over conductive pattern 404(21) and over (relative to the horizontal direction) gate pattern 430(4). Cut pattern 406(53) is located over conductive pattern 404(22) and between (relative to the horizontal direction) gate patterns 430(2) and 430(3).

In layout diagram 300A, a non-circular group 417A is indicated. non-circular group 417A includes cut patterns 406(51)-406(53) as members. Short axes of symmetry of cut patterns 406(51)-406(53) are substantially aligned with corresponding tracks T(2), T(6) and T(10) of row 402 such that non-circular group 417A is an intra-row non-circular group. In non-circular group 417A, cut patterns 406(51) and 406(52) are connected by an edge 412(21) and cut patterns 406(52) and 406(53) are connected by an edge 412(22). As such, in non-circular group 417A, cut pattern 406(53) is referred to as interior pattern, and cut patterns 406(51) and 406(53) also are referred to as terminating patterns.

Regarding non-circular group 417A, cut patterns 406(51) and 406(53) also are referred to as border patterns. The top boundary of row 402 is substantially collinear with track T(0) such that cut pattern 406(51) abuts the top boundary of row 402. The bottom boundary of row 402 is substantially collinear with track T(12) such that cut pattern 406(53) abuts the bottom boundary of row 402. As such, cut patterns 406(51) and 406(53) are also correspondingly referred to as border patterns 406(51) and 406(53). Accordingly, non-circular group 417A is an example of a non-circular group which includes two cut patterns which abut the opposite boundaries of the same row. More particularly, non-circular group 417A is an example of a non-circular group that includes two cut/border patterns (namely, cut patterns 406(51) and 406(53)) that abut correspondingly the top and bottom boundaries of the same row (namely row 402).

For purposes of pre-completion checking (for design rule violations) in a multi-patterning context, at least some embodiments treat multi-row cyclic groups as being comprised of non-circular groups, and pre-completion checking is applied to non-circular groups. At least some embodiments take into consideration non-circular groups such as non-circular group 417A in the context of a design rule, e.g., the second design rule. Again, the second design rule is directed to an intra-row non-circular group in which each of first and second ones of the cut patterns in the non-circular group are corresponding first and second border patterns, and the first and second border patterns abut corresponding first and second boundaries (different boundaries) of the row, and requires that a total number of cut patterns in an intra-row non-circular group must be even. In some embodiments, one or more other design rules are contemplated.

For purposes of discussion, a sequence of placement will be assumed in which cut patterns 406(51)-406(52) were placed in layout diagram 400A before the placement of cut pattern 406(53). In some embodiments, the sequences of placement are different. In some embodiments, upon attempting to place cut pattern 406(53) in the candidate location, namely over conductive pattern 404(22) and between (relative to the horizontal direction) gate patterns 430(2) and 430(3), a determination is made whether the candidate location would result not only in at least one of a non-circular group or a cyclic group but in at least one of a non-circular group or a cyclic group which would violate the second design rule. If so, then placement of cut pattern 406(53) in the candidate location would be prevented temporarily until a correction was made which avoids violating the second design rule.

In the example of FIG. 4A, the placement of cut pattern 406(53) in the candidate location not only results in a non-circular group (namely, non-circular group 417A), but also results in a non-circular group which violates the second design rule. The second design rule is violated, as indicated by circle-backslash symbol 411, because a total number of cut patterns in non-circular group 417A is an odd number (here, 3). Hence, placement of cut pattern 406(53) in the candidate location is prevented temporarily until a correction was made which avoids violating the second design rule. In contrast, an example of a non-circular group which does not violate the second design rule is provided by FIG. 4B, discussed below.

Figure 4B:
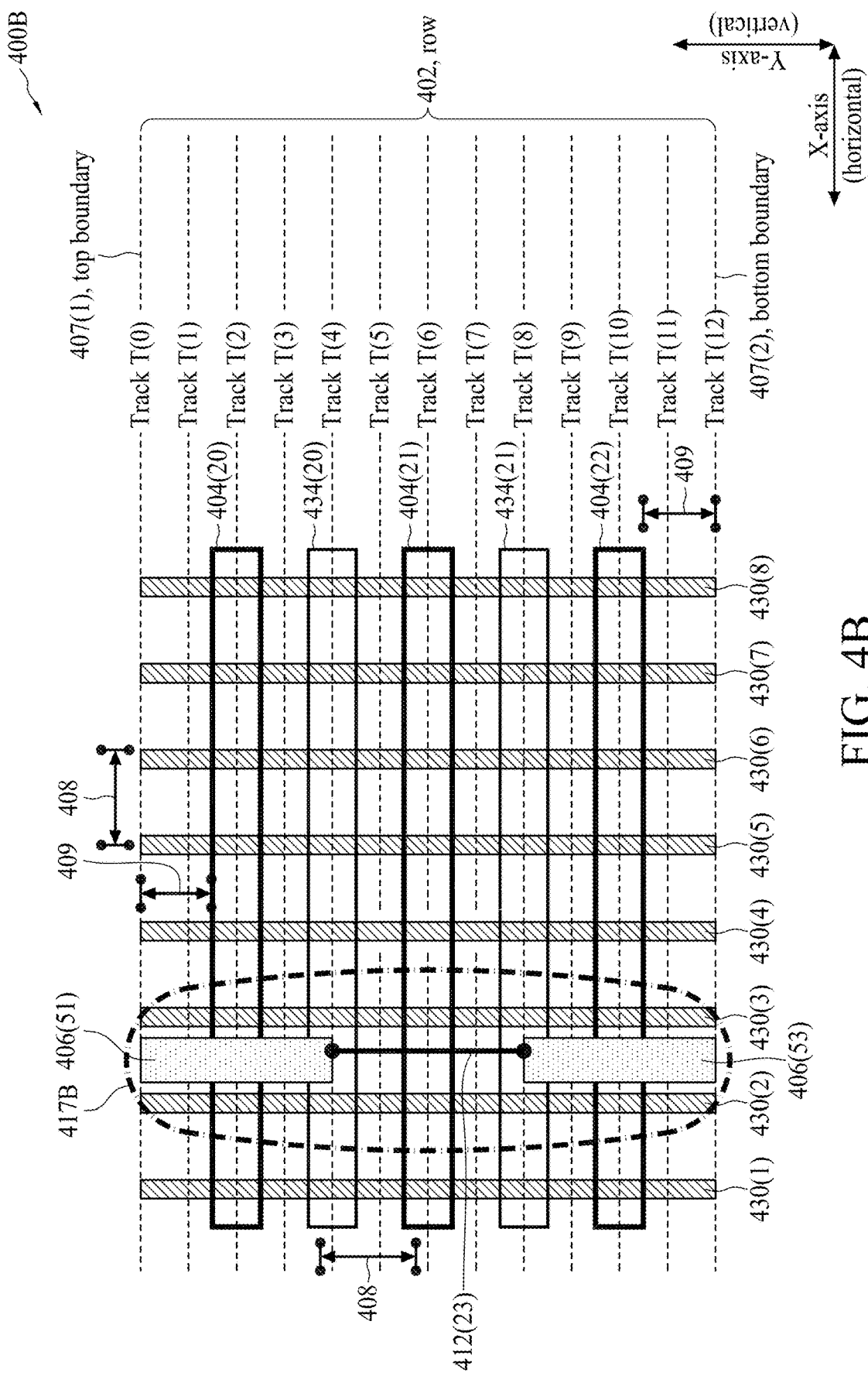
FIG. 4B is a layout diagram of a wire routing arrangement, in accordance with some embodiments.

FIG. 4B is a layout diagram 400B of a wire routing arrangement, in accordance with some embodiments.

Among other things, FIG. 4B provides context for the second design rule, e.g., by showing the placement of a given cut pattern in a candidate location in layout diagram 400B which would result in the formation of a non-circular group but which does not violate the second design rule, as discussed below.

Layout diagram 400B of FIG. 4B is similar to layout diagram 400A of FIG. 4A. An example of a semiconductor device having been fabricated based on a larger layout diagram which includes layout diagram 400A of FIG. 4A is semiconductor device 100 of FIG. 1, where one routing arrangement 104 corresponds to layout diagram 400A.

For brevity, the discussion of layout diagram 400B will focus on differences of layout diagram 400B with respect to layout diagram 400A.

Layout diagram 400B of FIG. 4B omits cut-pattern 406(52) relative to layout diagram 400A of FIG. 4A. For simplicity, in layout diagram 400B, it is assumed that the distance between cut patterns 406(51) and 406(53) is less than the minimum separation required between cut patterns, such that cut patterns 406(51) and 406(53) are connected by an edge 412(23), and thus represent a non-circular group 417B.

non-circular group 417B includes cut patterns 406(51) and 406(53) as members. Short axes of symmetry of cut patterns 406(51) and 406(53) are substantially aligned with corresponding tracks T(2) and T(10) of row 402 such that non-circular group 417B is an intra-row non-circular group. In non-circular group 417B, cut patterns 406(51) and 406(53) also are referred to as border patterns. As non-circular group 417B does not include a cut pattern that has at least two edges connecting it to at least two other cut patterns of non-circular group 417B, it is noted that non-circular group 417B does not include a cut pattern which would be referred to as an interior pattern.

In non-circular group 417B, cut patterns 406(51) and 406(53) also are referred to as border patterns. The top boundary of row 402 is substantially collinear with track T(0) such that cut pattern 406(51) abuts the top boundary of row 402. The bottom boundary of row 402 is substantially collinear with track T(12) such that cut pattern 406(53) abuts the bottom boundary of row 402. As such, cut patterns 406(51) and 406(53) are also correspondingly referred to as border patterns 406(51) and 406(53). Accordingly, non-circular group 417B is an example of a non-circular group which includes two cut patterns which abut the opposite boundaries of the same row. More particularly, non-circular group 417B is an example of a non-circular group that includes two cut/border patterns (namely, cut patterns 406(51) and 406(53)) that abut correspondingly the top and bottom boundaries of the same row (namely row 402).

For purposes of pre-completion checking (for design rule violations) in a multi-patterning context, at least some embodiments treat multi-row cyclic groups as being comprised of non-circular groups, and pre-completion checking is applied to non-circular groups. At least some embodiments take into consideration non-circular groups such as non-circular group 417A in the context of a design rule, e.g., the second design rule which (again) requires that a total number of cut patterns in an intra-row non-circular group must be even. In some embodiments, one or more other design rules are contemplated.

For purposes of discussion, a sequence of placement will be assumed in which cut pattern 406(51) was placed in layout diagram 400B before the placement of cut pattern 406(53). In some embodiments, the sequences of placement are different. In some embodiments, upon attempting to place cut pattern 406(53) in the candidate location, namely over conductive pattern 404(22) and between (relative to the horizontal direction) gate patterns 430(2) and 430(3), a determination is made whether the candidate location would result not only in at least one of a non-circular group or a cyclic group but in at least one of a non-circular group or a cyclic group which would violate the second design rule. If so, then placement of cut pattern 406(53) in the candidate location would be prevented temporarily until a correction was made which avoids violating the second design rule.

In the example of FIG. 4B, the placement of cut pattern 406(53) in the candidate location is determined to result in a non-circular group (namely, non-circular group 417B), but also is determined to not result in the formation of a non-circular group which violates the second design rule. Though non-circular group 417B is an example of a non-circular group which includes at least two cut patterns (again, cut patterns 406(51) and 406(53)) which abut opposite boundaries of the same row, the second design rule is not violated because a total number of cut patterns in non-circular group 417B is an even number (here, 2).

Figure 5:
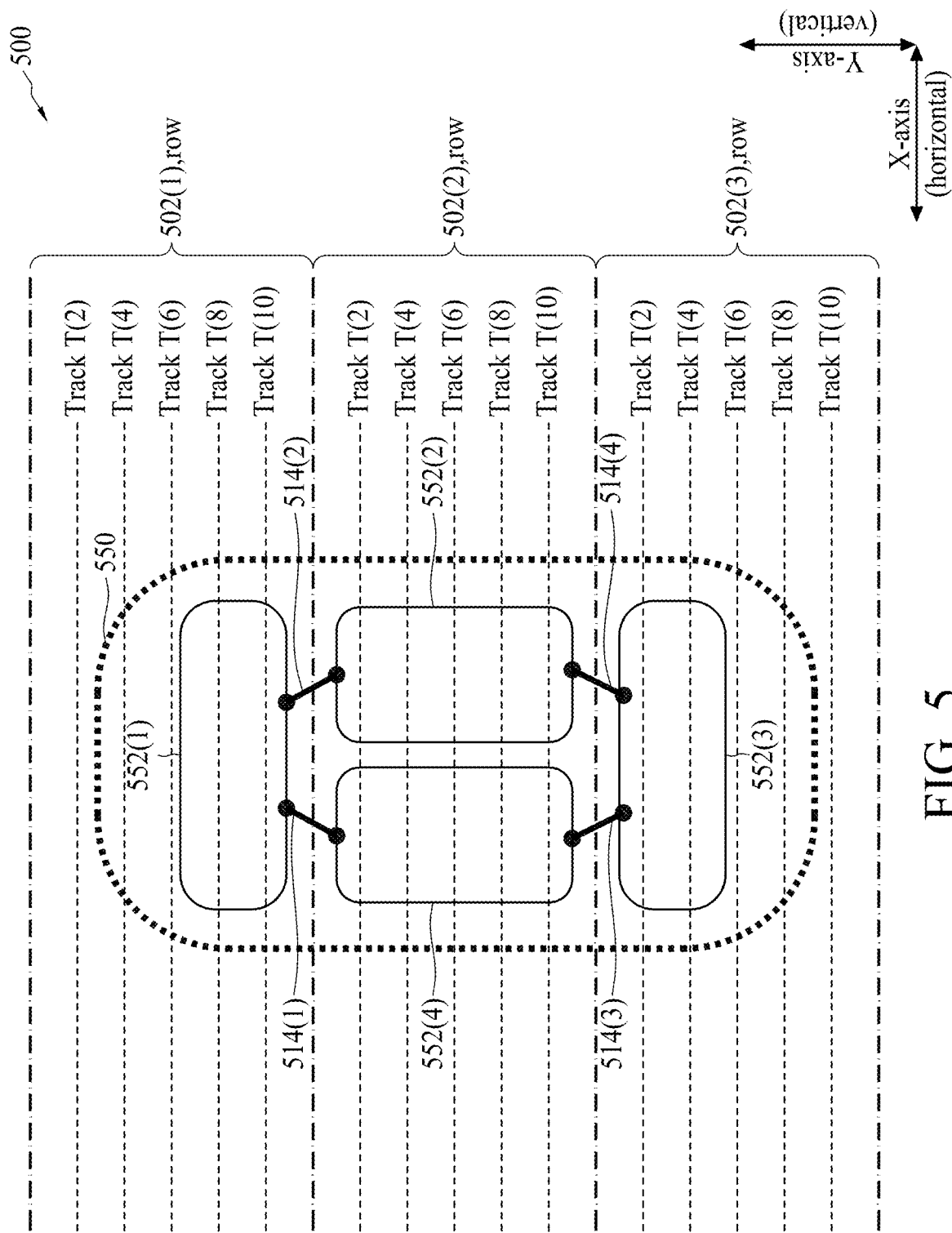
FIG. 5 is a layout diagram of a wire routing arrangement, in accordance with some embodiments.

FIG. 5 is a layout diagram 500 of a wire routing arrangement, in accordance with some embodiments.

Among other things, layout diagram 500 shows a multi-row cyclic group 550 as being comprised of non-circular groups, as discussed below.

Layout diagram 500 of FIG. 5 is similar to layout diagrams 200A-200B of corresponding FIGS. 2A-2B. An example of a semiconductor device having been fabricated based on a larger layout diagram which includes layout diagram 500 of FIG. 5 is semiconductor device 100 of FIG. 1, where one routing arrangement 104 corresponds to layout diagram 500. For brevity, the discussion of layout diagram 500 will focus on differences of layout diagram 500 with respect to layout diagram 200B.

In FIG. 5, for simplicity of discussion (and illustration), no cut patterns are shown which otherwise would be similar to cut patterns 206(1)-206(12) of layout diagram 200B of FIG. 2B, nor are conductive patterns shown which otherwise would be similar to conductive patterns 240(1)-240(6) of layout diagram 200A of FIG. 2A. Also, non-circular groups 210, 216, 222 and 228 of layout diagram 200B are omitted from layout diagram 500. Relative to layout diagram 200B of FIG. 2B: layout diagram 500 includes rows 502(1) and 502(3), which are disposed correspondingly above row 502(2); and layout diagram 500 shows non-circular groups including non-circular groups 552(1), 552(2), 552(3) and 552(4).

Each of non-circular groups 552(1), 552(2), 552(3) and 552(4) is an intra-row group. non-circular group 552(1) is intra-row with respect to row 502(1). Each of non-circular groups 552(2) and 552(4) is intra-row with respect to row 502(2). non-circular group 552(3) is intra-row with respect to row 502(1).

non-circular group 522(1) is similar to non-circular group 222 in that non-circular group 552(1) includes two cut/border patterns (not shown) each of which abuts the bottom boundary of the same row (namely row 502(1)). Each of non-circular groups 522(2) and 522(4) is similar to non-circular group 210 and non-circular group 415B in that each of non-circular groups 522(2) and 522(4) includes two cut/border patterns (not shown) that abut correspondingly the top and bottom boundaries of the same row (namely row 502(2)). non-circular group 522(3) is similar to non-circular group 216 and group 315B in that non-circular group 552(3) includes two cut/border patterns (not shown) each of which abuts the top boundary of the same row (namely row 502(3)).

A first cut-pattern (not shown) in non-circular group 552(1) is connected by an edge 514(2) to a first cut-pattern (not shown) in group 552(2). A second cut-pattern (not shown) in non-circular group 552(2) is connected by an edge 514(4) to a first cut-pattern (not shown) in group 552(3). A second cut-pattern (not shown) in non-circular group 552(3) is connected by an edge 514(3) to a first cut-pattern (not shown) in group 552(4). A second cut-pattern (not shown) in non-circular group 552(4) is connected by an edge 514(1) to a second cut-pattern (not shown) in group 552(1).

As a result of edges 514(1)-514(4) connecting corresponding non-circular groups 552(1)-552(4), cyclic group 550 is formed. Furthermore, because one or more cut patterns in cyclic group 550 are dispersed across at least two rows (here, across rows 502(1)-502(3)), cyclic group 550 is multi-row cyclic group.

For purposes of pre-completion checking (for design rule violations), at least some embodiments take into consideration certain types of cyclic groups, namely multi-row cyclic groups (see discussion of FIG. 6 below).

Figure 6:
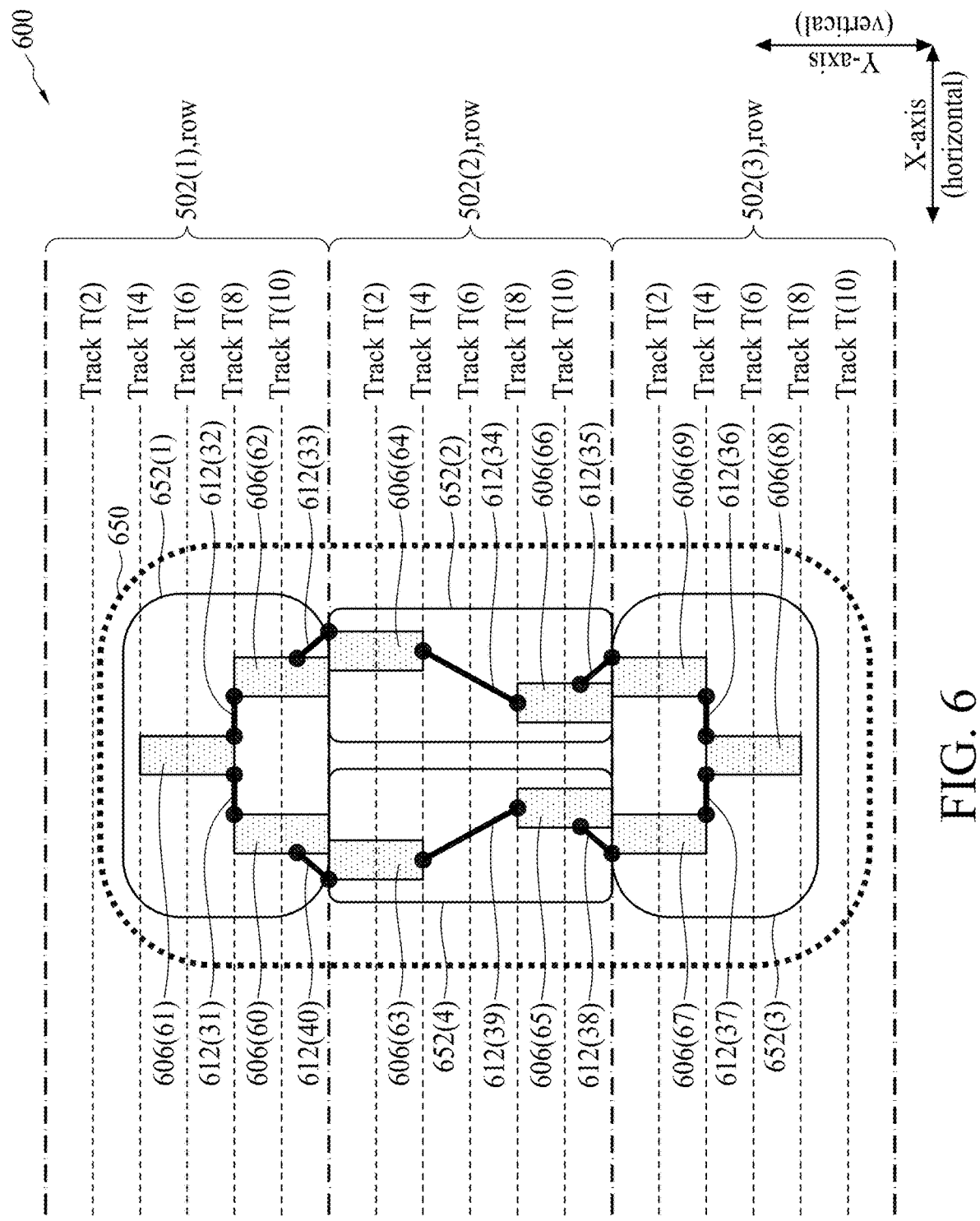
FIG. 6 is a layout diagram of a wire routing arrangement, in accordance with some embodiments.

FIG. 6 is a layout diagram 600 of a wire routing arrangement, in accordance with some embodiments.

Among other things, layout diagram 600 provides context for a third design rule, e.g., by showing a multi-row cyclic group 650 (and cut patterns included therein) which does not violate the third design rule.

Layout diagram 600 of FIG. 6 is similar to layout diagram 500 of FIG. 2B. An example of a semiconductor device having been fabricated based on a larger layout diagram which includes layout diagram 600 of FIG. 6 is semiconductor device 100 of FIG. 1, where one routing arrangement 104 corresponds to layout diagram 600. For brevity, the discussion of layout diagram 600 will focus on differences of layout diagram 600 with respect to layout diagram 500A.

cyclic group 650 includes non-circular groups 652(1), 652(2), 653(3) and 652(4). In FIG. 6, cut patterns 606(60)-606(63) have been added relative to layout diagram 500 of FIG. 5.

non-circular group 652(1) of FIG. 6 includes cut patterns 606(60)-606(62).

Short axes of symmetry of cut patterns 606(60)-606(62) are substantially aligned with corresponding tracks T(10), T(6) and T(10) such that non-circular group 652(1) is an intra-row non-circular group. In non-circular group 652(1), cut patterns 606(60) and 606(61) are connected by an edge 612(31), and cut patterns 606(61) and 606(62) are connected by an edge 612(32). As such, in non-circular group 652(1), cut pattern 606(61) also is referred to as an interior pattern, and cut patterns 606(60) and 606(62) also are referred to as terminating patterns. Cut patterns 606(60) and 606(62) also are referred to as border patterns. The bottom boundary of row 602(1) is substantially collinear with track T(12) (not shown) of row 602(1) (which is also substantially collinear with track T(0) (not shown) of row 602(2)) such that each of cut patterns 606(60) and 606(62) of non-circular group 652(1) abuts the bottom boundary of row 602(1) and so cut patterns 606(60) and 606(62) are also correspondingly referred to as border patterns 606(60) and 606(62). Accordingly, non-circular group 652(1) is an example of a non-circular group which includes two cut/border patterns (namely, cut patterns 606(60) and 606(62)) each of which abuts the same boundary (namely, the bottom boundary) of the same row (namely row 602(1)).

non-circular group 652(2) of FIG. 6 includes cut patterns 606(64) and 606(66). Short axes of symmetry of cut patterns 606(64) and 606(66) are substantially aligned with corresponding tracks T(2) and T(10) of row 602(2) such that non-circular group 652(2) is an intra-row non-circular group. In non-circular group 652(2), cut patterns 606(64) and 606(66) also are referred to as border patterns. As non-circular group 652(2) does not include a cut pattern that has at least two edges connecting it to at least two other cut patterns of non-circular group 652(2), it is noted that non-circular group 652(2) does not include a cut pattern which would be referred to as an interior pattern. In non-circular group 652(2), cut patterns 606(64) and 606(66) also are referred to as border patterns. The top boundary of row 602(2) is substantially collinear with track T(0) (not shown) of row 602(2) (which is also substantially collinear with track T12 (not shown) of row 602(1)) such that cut pattern 606(64) abuts the top boundary of row 602(2). The bottom boundary of row 602(2) is substantially collinear with track T(12) (not shown) of row 602(2) (which is also substantially collinear with track T0 (not shown) of row 602(3)) such that cut pattern 606(66) abuts the bottom boundary of row 602(2). As such, cut patterns 606(64) and 606(66) are also correspondingly referred to as border patterns 606(64) and 606(66). Accordingly, non-circular group 652(2) is an example of a non-circular group which includes two cut patterns which abut the opposite boundaries of the same row. More particularly, non-circular group 652(2) is an example of a non-circular group that includes two cut/border patterns (namely, cut patterns 606(64) and 606(66)) that abut correspondingly the top and bottom boundaries of the same row (namely row 602(2)).

non-circular group 652(3) of FIG. 6 includes cut patterns 606(67)-606(69). Short axes of symmetry of cut patterns 606(67)-606(69) are substantially aligned with corresponding tracks T(2), T(6) and T(2) such that non-circular group 652(3) is an intra-row non-circular group. In non-circular group 652(3), cut patterns 606(67) and 606(68) are connected by an edge 612(37), and cut patterns 606(68) and 606(69) are connected by an edge 612(36). As such, in non-circular group 652(3), cut pattern 606(68) also is referred to as an interior pattern, and cut patterns 606(67) and 606(69) also are referred to as terminating patterns. Cut patterns 606(67) and 606(69) also are referred to as border patterns. The top boundary of row 602(3) is substantially collinear with track T(0) (not shown) of row 602(3) (which is also substantially collinear with track T(12) (not shown) of row 602(2)) such that each of cut patterns 606(67) and 606(69) of non-circular group 652(3) abuts the top boundary of row 602(3) and so cut patterns 606(67) and 606(69) are also correspondingly referred to as border patterns 606(67) and 606(69). Accordingly, non-circular group 652(3) is an example of a non-circular group which includes two cut/border patterns (namely, cut patterns 606(67) and 606(69)) each of which abuts the same boundary (namely, the top boundary) of the same row (namely row 602(3)).

non-circular group 652(4) of FIG. 6 includes cut patterns 606(63) and 606(64). Short axes of symmetry of cut patterns 606(63) and 606(65) are substantially aligned with corresponding tracks T(2) and T(10) of row 602(2) such that non-circular group 652(4) is an intra-row non-circular group. In non-circular group 652(4), cut patterns 606(63) and 606(65) also are referred to as border patterns. As non-circular group 652(4) does not include a cut pattern that has at least two edges connecting it to at least two other cut patterns of non-circular group 652(4), it is noted that non-circular group 652(4) does not include a cut pattern which would be referred to as an interior pattern. In non-circular group 652(4), cut patterns 606(63) and 606(65) also are referred to as border patterns. The top boundary of row 602(2) is substantially collinear with track T(0) (not shown) of row 602(2) (which is also substantially collinear with track T12 (not shown) of row 602(1)) such that cut pattern 606(63) abuts the top boundary of row 602(2). The bottom boundary of row 602(2) is substantially collinear with track T(12) (not shown) of row 602(2) (which is also substantially collinear with track T0 (not shown) of row 602(3)) such that cut pattern 606(65) abuts the bottom boundary of row 602(2). As such, cut patterns 606(63) and 606(65) are also correspondingly referred to as border patterns 606(63) and 606(65). Accordingly, non-circular group 652(4) is an example of a non-circular group which includes two cut patterns which abut the opposite boundaries of the same row. More particularly, non-circular group 652(4) is an example of a non-circular group that includes two cut/border patterns (namely, cut patterns 606(63) and 606(65)) that abut correspondingly the top and bottom boundaries of the same row (namely row 602(2)).

In layout diagram 600, cyclic group 650 not only includes the edges included in the non-circular groups (as discussed above), namely non-circular groups 652(1)-652(4), but further includes edges which connect non-circular groups. More particularly, cyclic group 650 includes edges 612(33), 612(35), 612(38) and 612(40).

Edge 612(33) connects non-circular group 652(1) and non-circular group 652(2). More particularly, edge 612(33) connects cut pattern 606(62) of non-circular group 652(1) to cut pattern 606(64) of non-circular group 652(2). Edge 612(35) connects non-circular group 652(2) and non-circular group 652(3). More particularly, edge 612(35) connects cut pattern 606(66) of non-circular group 652(2) to cut pattern 606(69) of non-circular group 652(3). Edge 612(38) connects non-circular group 652(3) and non-circular group 652(4). More particularly, edge 612(38) connects cut pattern 606(67) of non-circular group 652(3) to cut pattern 606(65) of non-circular group 652(4). Edge 612(40) connects non-circular group 652(4) and non-circular group 652(1). More particularly, edge 612(40) connects cut pattern 606(63) of non-circular group 652(4) to cut pattern 606(60) of non-circular group 652(1).

For purposes of pre-completion checking (for design rule violations) in a multi-patterning context, at least some embodiments take into consideration cyclic groups such as cyclic group 650 in the context of a design rule, e.g., the third design rule which (again) requires that a total number of cut patterns in a multi-row cyclic group must be even. In some embodiments, one or more other design rules are contemplated.

For purposes of discussion, a sequence of placement will be assumed in which cut patterns 606(60)-606(68) were placed in layout diagram 600 before the placement of cut pattern 606(69). In some embodiments, the sequences of placement are different. It will be further assumed that a candidate location for the placement of cut pattern 606(69) is such that a short axis of symmetry of cut pattern 606(69) is substantially collinear with track T(2) of row 602(3) and, relative to the horizontal direction, cut pattern 606(69)

overlaps cut pattern 606(66). In some embodiments, upon attempting to place cut pattern 606(69) at the candidate location, a determination is made whether the candidate location would result not only in at least one of a non-circular group or a cyclic group but in at least one of a non-circular group or a cyclic group which would violate the third design rule. If so, then placement of cut pattern 606(46) in the candidate location would be prevented temporarily until a correction was made which avoids violating the third design rule.

In the example of FIG. 6, the placement of cut pattern 606(69) in the candidate location is determined to result in a cyclic group (namely, cyclic group 650), but also is determined to not result in the formation of a cyclic group which violates the third design rule. Though cyclic group 650 is determined to be a multi-row group because cut patterns thereof are dispersed across multiple rows (here, across rows 602(1)-602(3), as discussed above), the third design rule is not violated because a total number of cut patterns in non-circular group 650 is an even number (here, 10).

In some embodiments, with each incremental placement of a cut pattern in the sequence of placement assumed for FIG. 6, a determination also is made whether the candidate location for the incremental placement would result not only in at least one of a non-circular group or a cyclic group but in at least one of a non-circular group or a cyclic group which would violate the first and/or second design rules. Regarding the sequence of placement assumed for FIG. 6, pre-completion checking is applied to non-circular group 652(1), then 652(4), then 653(2), and then 652(3).

In the example of FIG. 6, non-circular groups 652(1) and 652(3) are pertinent to (e.g., are identified by) the first design rule, though neither of non-circular groups 652(1) and 652(3) violate the first design rule. Also in the example of FIG. 6, non-circular groups 652(2) and 652(4) are pertinent to (e.g., are identified by) the second design rule, though neither of non-circular groups 652(2) and 652(4) violate the second design rule.

Recalling that multi-row cyclic group 650 of FIG. 6 is a specific example of multi-row cyclic group 550 of FIG. 5, it is noted that the third design rule (which, again, requires that a total number of cut patterns in a multi-row cyclic group must be even), will be satisfied if first and second conditions are true. The first condition is that the tally of cut patterns in each of non-circular groups 552(1) and 552(3) is odd or the tally of cut patterns in each of non-circular groups 552(1) and 552(3) is even. However, the first condition does not require that the tally of cut patterns in each of non-circular groups 552(1) and 552(3) be the same. The second condition is that the tally of cut patterns in each of non-circular groups 552(2) and 552(4) is odd or the tally of cut patterns in each of non-circular groups 552(2) and 552(4) is even. However, the second condition does not require that the tally of cut patterns in each of non-circular groups 552(2) and 552(4) be the same.

Figure 7:
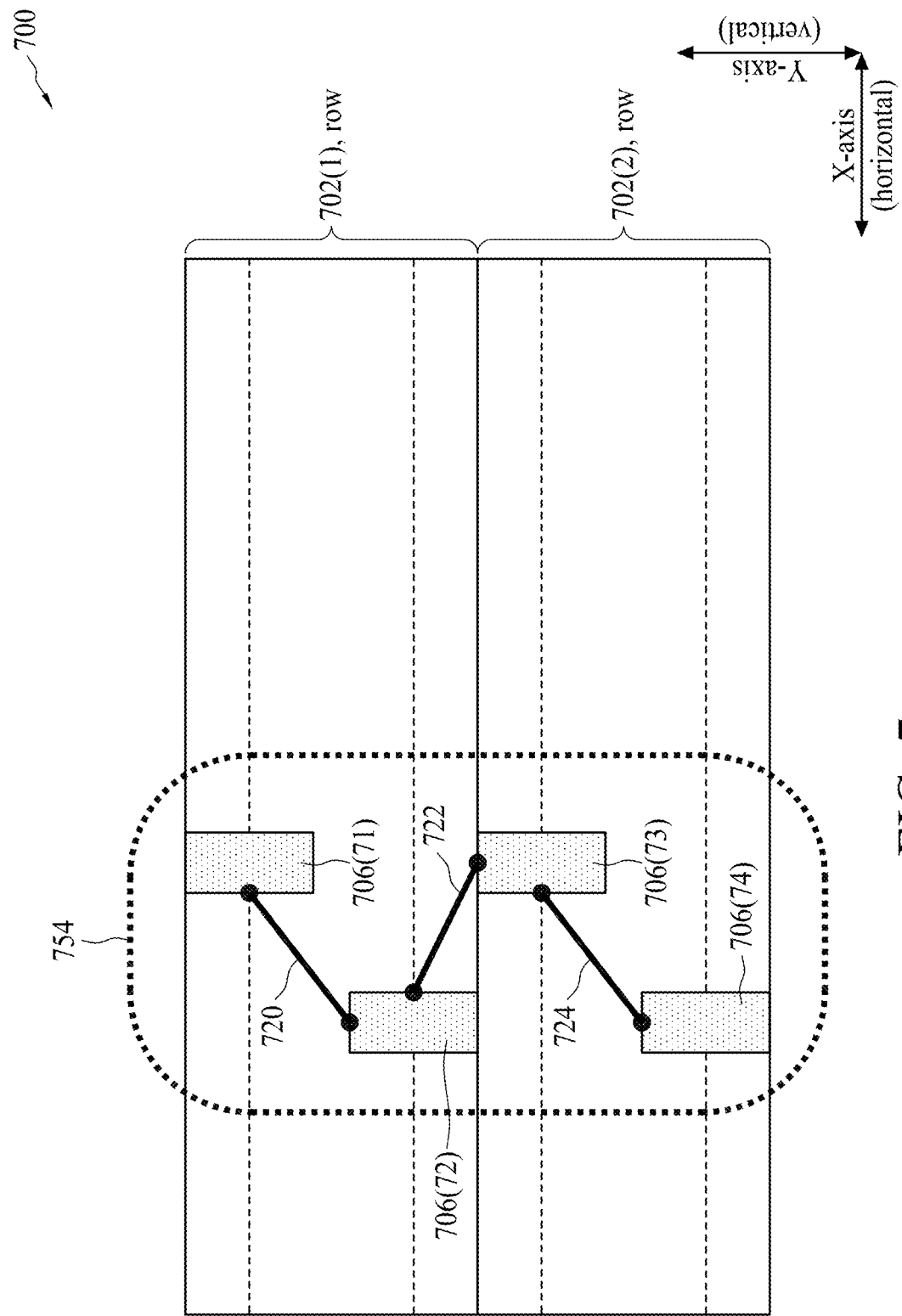
FIG. 7 is a layout diagram of a wire routing arrangement, in accordance with some embodiments.

FIG. 7 is a layout diagram 700 of a wire routing arrangement, in accordance with some embodiments.

Among other things, layout diagram 700 shows a multi-row non-circular group.

An example of a semiconductor device having been fabricated based on a larger layout diagram which includes layout diagram 700 of FIG. 7 is semiconductor device 100 of FIG. 1, where one routing arrangement 104 corresponds to layout diagram 700.

Layout diagram 700 of FIG. 7 is similar to layout diagram 600 of FIG. 6 in that, e.g., layout diagram 700 includes multiple rows 702(1) and 702(2), conductive patterns are omitted which would correspond to the cut patterns which are shown, or the like.

Group 754 includes cut patterns 706(71), 706(72), 706(73) and 706(74) connected by corresponding edges 720, 722, and 724. Cut pattern 706(71) is connected to cut pattern 706(72) by edge 720. Cut pattern 706(72) is connected to cut pattern 706(73) by edge 722. Cut pattern 706(73) is connected to cut pattern 706(74) by edge 724.

Short axes of symmetry of cut patterns 706(71) and 706(72) are substantially aligned with corresponding tracks of row 702(1). Short axes of symmetry of cut patterns 706(73) and 706(74) are substantially aligned with corresponding tracks of row 702(2). Because one or more cut patterns in cyclic group 754 are dispersed across at least two rows (here, across rows 702(1) and 702(2)), cyclic group 754 is multi-row non-circular group.

Figure 8A:
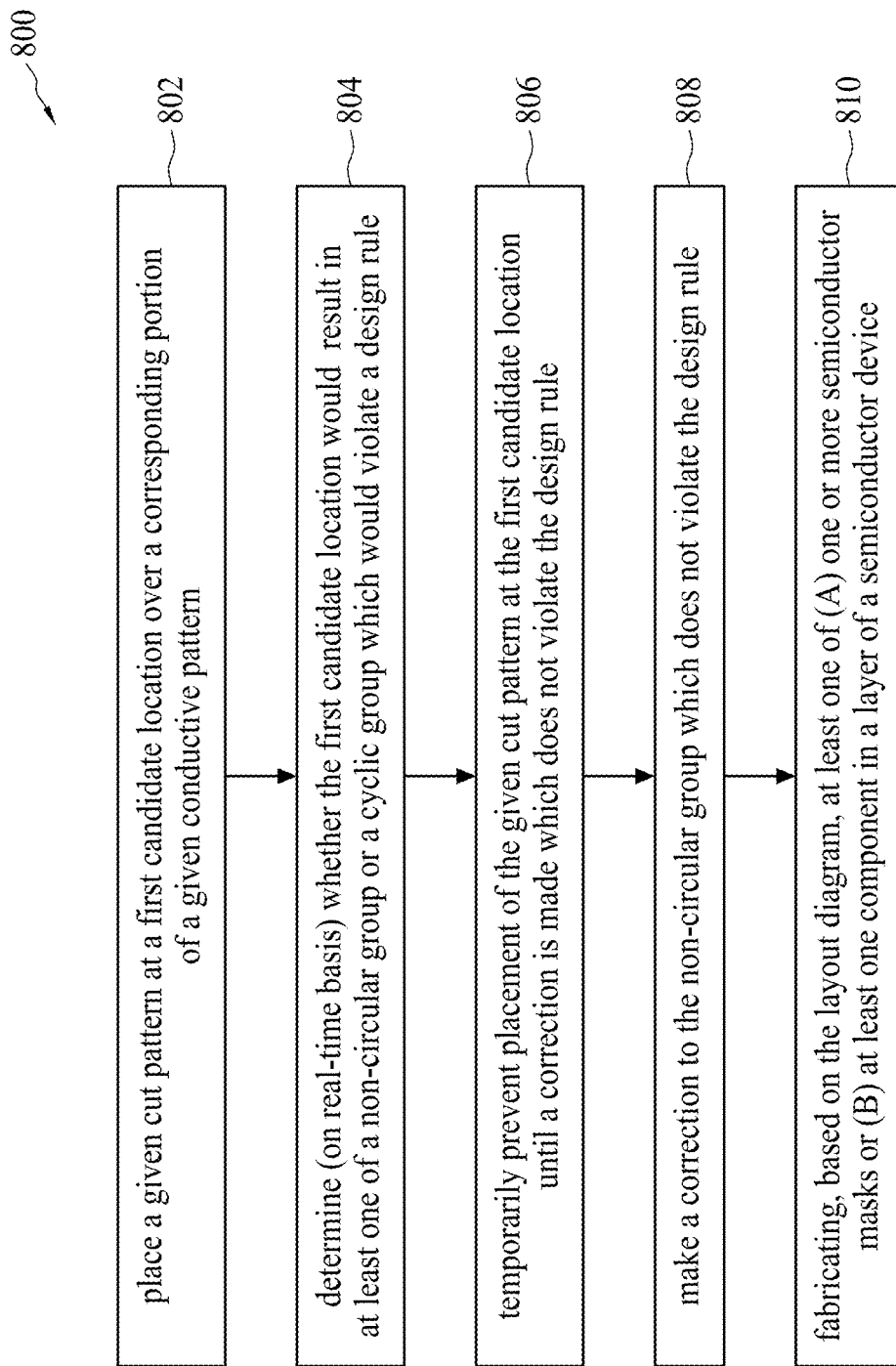
FIG. 8A is a flowchart of a method of generating a layout diagram of a wiring arrangement, in accordance with some embodiments.

FIG. 8A is a flowchart of a method 800 of generating a layout diagram of a wiring arrangement, in accordance with some embodiments.

Method 800 is implementable, for example, using EDA system 900 (FIG. 9, discussed below), in accordance with some embodiments. Regarding method 800, examples of the layout diagrams includes layout diagrams 200B, 300B, 400B, 500, 600 and 700 of corresponding FIGS. 2B, 3B, 4B, 5, 6 and 7.

In FIG. 8, method 800 includes blocks 802-810. At block 802, a given cut pattern is placed at a first candidate location over a corresponding portion of a given conductive pattern in a metallization layer. Examples of the given cut pattern include cut pattern 306(44) in FIG. 3A, 306(46) in FIG. 3B, 406(53) in FIG. 4A, 406(53) in FIG. 4B, 606(69) in FIG. 6, or the like. Examples of the conductive patterns include conductive patterns 204(1)-204(6) of FIG. 2A or the like. From block 802, flow proceeds to block 804.

At block 804, a determination is made (on a real-time basis) whether the placement of the given cut pattern at the first candidate location results not only in at least one of a non-circular group or a cyclic group but in at least one of a non-circular group or a cyclic group which would violate a design rule. Examples of the design rule include the first design rule (discussed above, e.g., in the context of FIGS. 3A-3B), the second design rule (discussed above, e.g., in the context of FIGS. 4A-4B), or the third design rule (discussed above, e.g., in the context of FIG. 6). From block 804, flow proceeds to block 806.

At block 806, placement of cut pattern 306(44) the placement of the given cut pattern at the candidate location is prevented temporarily until a correction is made which avoids violating the first design rule. From block 806, flow proceeds to block 808. At block 808, a correction is made to the non-circular group such that the corrected non-circular group does not violate the design rule. In some embodiments, making a correction to the non-circular group includes: placing the given cut pattern at a second candidate location over the given conductive pattern in the metallization layer; checking (on a real-time basis) whether the second candidate location would not violate the design rule; and placing, if violation is avoided, the given cut pattern in the metallization layer at the second candidate location. In some embodiments, making a correction to the non-circular group includes: relocating (on a real-time basis) at least one of the one or more other cut patterns in the non-circular group correspondingly to at least one revised location resulting in a revised non-circular group; checking (on a real-time basis) whether the revised non-circular group avoids violating the design rule; and placing, if violation is avoided, the at least one of the one or more other cut patterns at the corresponding at least one revised location. From block 808, flow proceeds to block 810.

At block 810, based on the layout diagram, at least one of (A) one or more semiconductor masks or (B) at least one component in a layer of a semiconductor device is fabricated. See discussion below of FIG. 10. In some embodiments, the fabricating further includes performing one or more lithographic exposures based on the revised layout diagram.

Figure 8B:
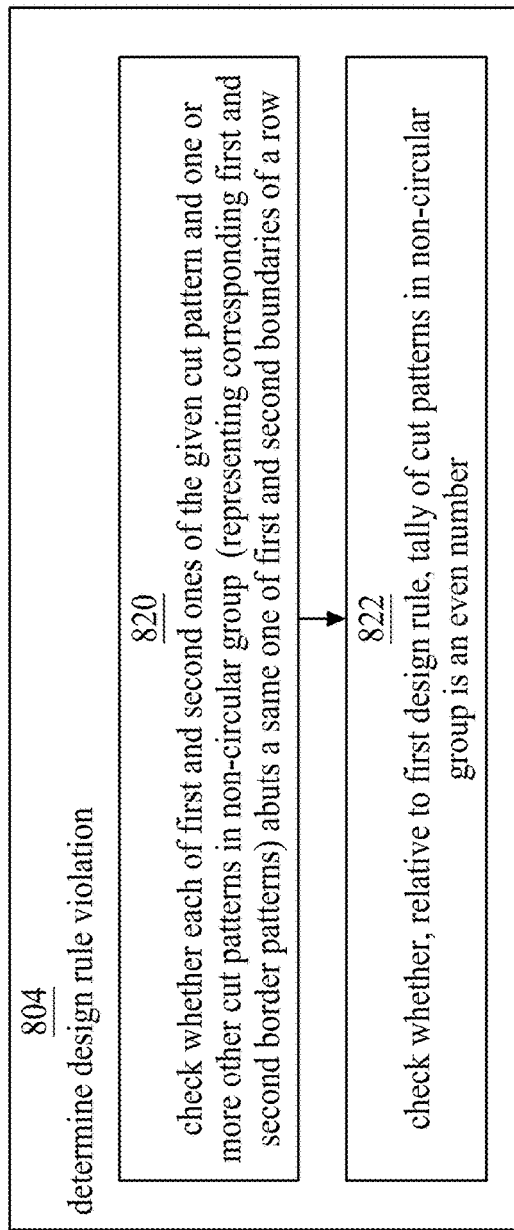
FIG. 8B is a flowchart of showing more detail regarding a block of the method of FIG. 8A, in accordance with some embodiments.

FIG. 8B is a flowchart of showing more detail regarding block 804 of method 800, in accordance with some embodiments.

In FIG. 8B, block 804 (which determines a design rule violation, see FIG. 8A discussed above) is shown as including blocks 820-822. At block 820, it is checked not only whether the placement would result in a non-circular group, but also a first circumstance is checked whether each of first and second ones of the given cut pattern and one or more other cut patterns in non-circular group (representing corresponding first and second border patterns) abuts a same one of first and second boundaries of a row. Examples of the first circumstance include the locations of cut patterns 306(41) and 306(44) in cyclic group 315A in FIG. 3A, and the locations of cut patterns 306(41) and 306(46) in FIG. 3B. From block 820, flow proceeds to block 822. At block 822, relative to the first design rule (discussed above), a second circumstance is checked in which a tally of cut patterns in the non-circular group is an even number. An example of the second circumstance is that the tally of cut patterns in cyclic group 315A in FIG. 3A is an even number (there, 4), which violates the first design rule. By contrast, it is noted that the tally of cut patterns in cyclic group 315B in FIG. 3B is an odd number (there, 5), which does not violate the first design rule.

Figure 8C:
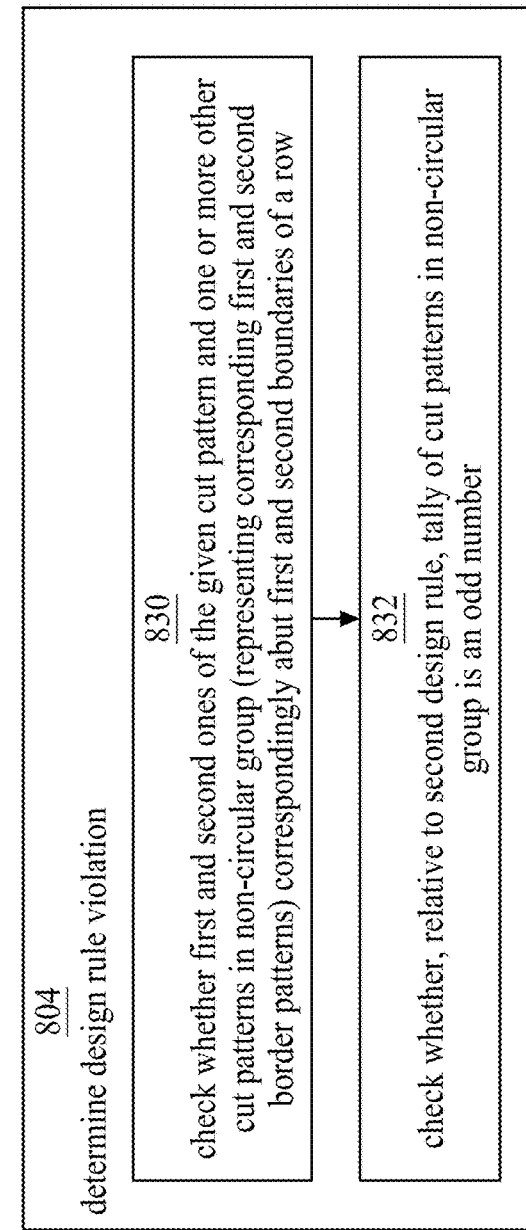
FIG. 8C is a flowchart of showing more detail regarding a block of the method of FIG. 8A, in accordance with some embodiments.

FIG. 8C is a flowchart of showing more detail regarding block 804 of method 800, in accordance with some embodiments.

In FIG. 8C, block 804 (which determines a design rule violation, see FIG. 8A discussed above) is shown as including blocks 830-832. At block 830, it is checked not only whether the placement would result in a non-circular group, but also a third circumstance is checked whether which first and second ones of the given cut pattern and one or more other cut patterns in non-circular group (representing corresponding first and second border patterns) correspondingly abut first and second boundaries of a row. Examples of the third circumstance include the locations of cut patterns 406(51) and 406(53) in FIG. 4A, and the locations of cut patterns 406(51) and 406(53) in FIG. 4B. From block 830, flow proceeds to block 832.

At block 832, relative to the second design rule (discussed above), a fourth circumstance is checked whether a tally of cut patterns in the non-circular group is an odd number. An example of the fourth circumstance is that the tally of cut patterns in cyclic group 417A in FIG. 4A is an odd number (there, 3), which violates the second design rule. By contrast, it is noted that the tally of cut patterns in cyclic group 417B in FIG. 4B is an even number (there, 2), which does not violate the second design rule.

Figure 8D:
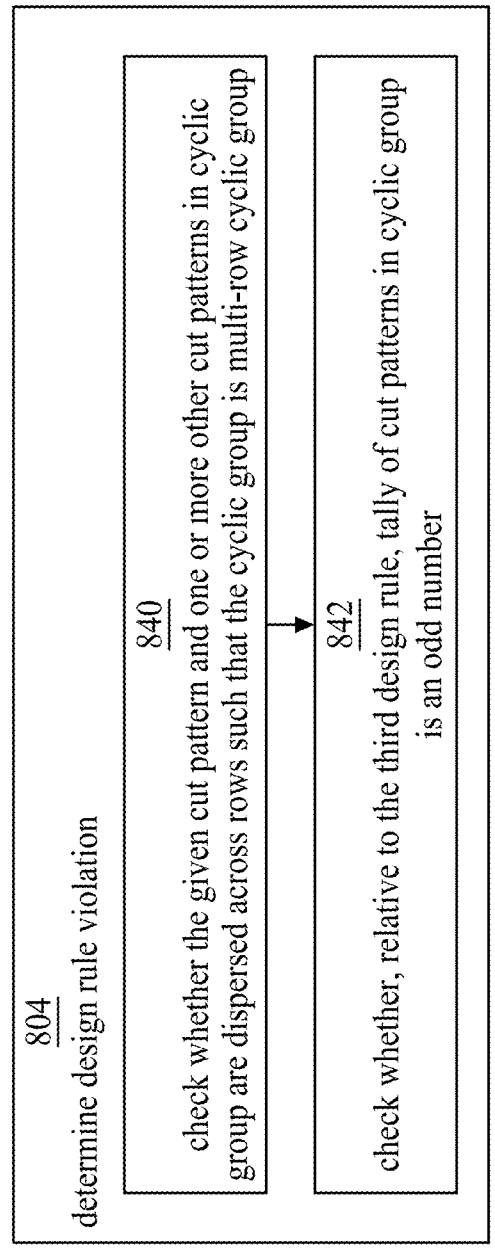
FIG. 8D is a flowchart of showing more detail regarding a block of the method of FIG. 8A, in accordance with some embodiments.

FIG. 8D is a flowchart of showing more detail regarding block 804 of method 800, in accordance with some embodiments.

In FIG. 8D, block 804 (which determines a design rule violation, see FIG. 8A discussed above) is shown as including blocks 840-842. At block 840, it is checked not only that the placement would result in a cyclic group, but also a fifth circumstance is identified in which the given cut pattern and one or more other cut patterns in the cyclic group are dispersed across rows such that the cyclic group is a multi-row cyclic group. An example of the fifth circumstance is cyclic group 650 in FIG. 6. From block 840, flow proceeds to block 842.

At block 842, relative to the third design rule (discussed above), a sixth circumstance is identified in which a tally of cut patterns in the cyclic group is an odd number. An example of the sixth circumstance would be if, e.g., one cut pattern was removed from cyclic group 650 to form a revised cyclic group 650' (not shown) such that the tally of cyclic group 650' was 9, which is an odd number and which would violate the third design rule. By contrast, it is noted that the tally of cut patterns cyclic group 650 in FIG. 6 is an even number (there, 10), which does not violate the third design rule.

Figure 9:
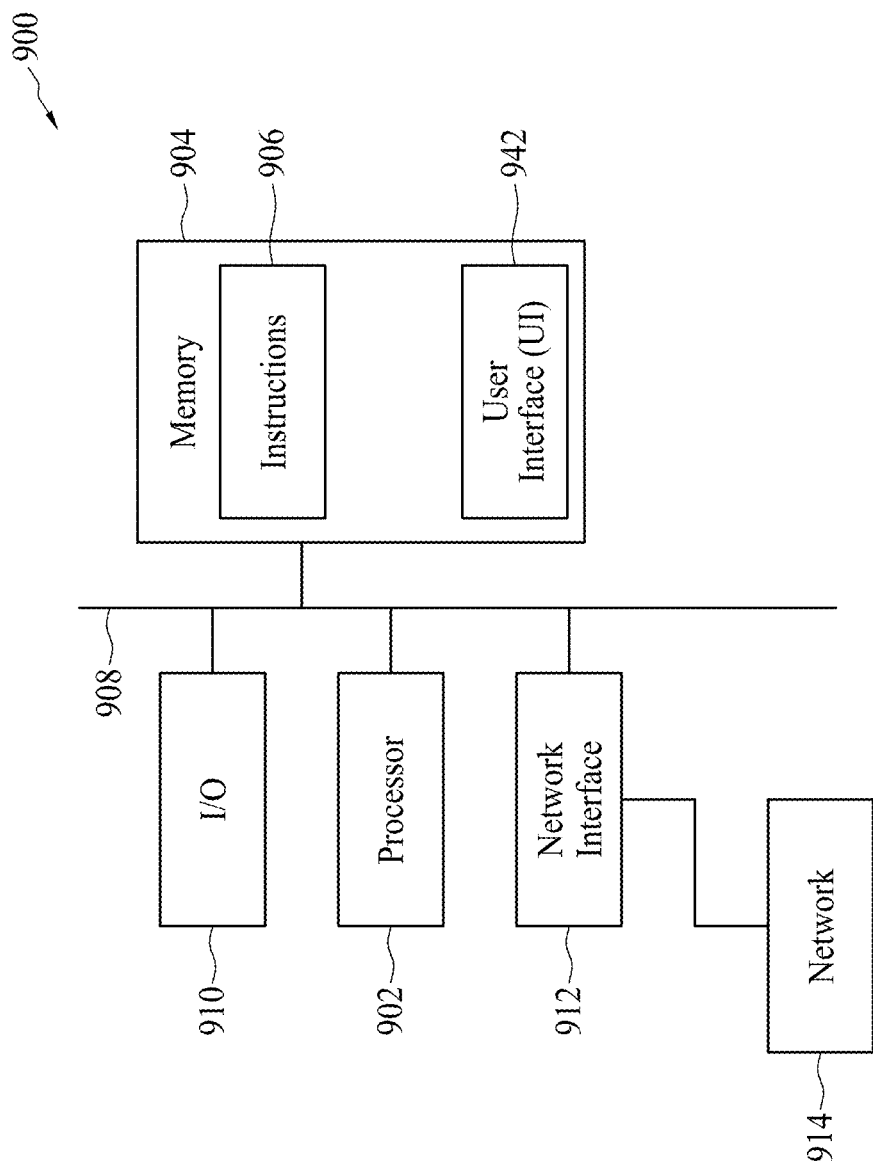
FIG. 9 is a block diagram of an electronic design automation (EDA) system in accordance with some embodiments.

FIG. 9 is a block diagram of an electronic design automation (EDA) system 900 in accordance with some embodiments.

In some embodiments, EDA system 900 includes an APR system. Methods described herein of designing layout diagrams of a wire-routing arrangement, in accordance with one or more embodiments, are implementable, for example, using EDA system 900, in accordance with some embodiments.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) an EDA tool which implements a portion or all of, e.g., the methods described herein in accordance with one or more (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause system 900 (where such execution represents (at least in part) the EDA tool) to be usable for performing a portion or all of the noted processes and/or methods. In one or more embodiments, storage medium 904 also stores information which facilitates performing a portion or all of the noted processes and/or methods. In one or more embodiments, storage medium 904 stores library 907 of standard cells including such standard cells as disclosed herein.

EDA system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

EDA system 900 also includes network interface 912 coupled to processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1464. In one or more embodiments, a portion or all of noted processes and/or methods, is implemented in two or more systems 900.

System 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. EDA system 900 is configured to receive information related to a UI through I/O interface 910. The information is stored in computer-readable medium 904 as user interface (UI) 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 10:
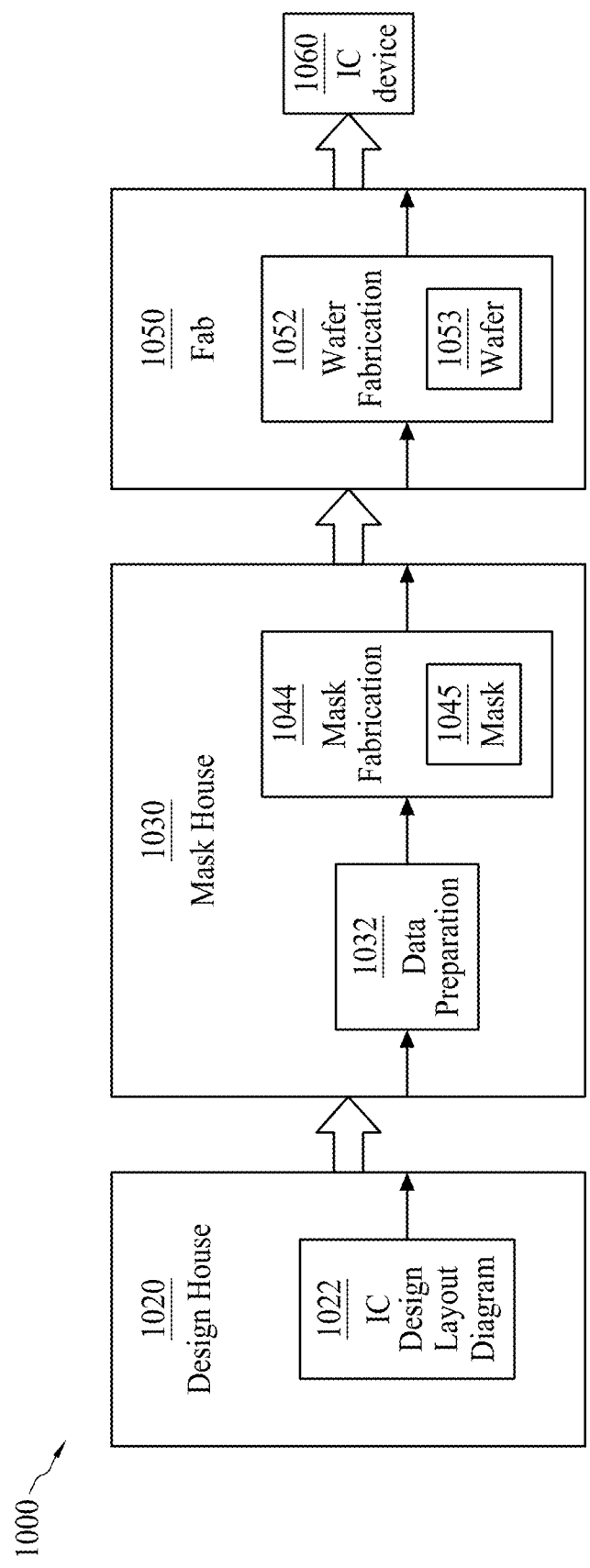
FIG. 10 is a block diagram of an integrated circuit (IC) manufacturing system, and an IC manufacturing flow associated therewith, in accordance with some embodiments.

FIG. 10 is a block diagram of an integrated circuit (IC) manufacturing system 1000, and an IC manufacturing flow associated therewith, in accordance with some embodiments.

In some embodiments, based on a layout diagram, at least one of (A) one or more semiconductor masks or (B) at least one component in a layer of a semiconductor device is fabricated using manufacturing system 1000.

In FIG. 10, IC manufacturing system 1000 includes entities, such as a design house 1020, a mask house 1040, and an IC manufacturer/fabricator ("fab") 1050, that interact with one another in the design, development, and manufacturing cycles and/or services related to manufacturing an IC device 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1040, and IC fab 1050 is owned by a single larger company. In some embodiments, two or more of design house 1020, mask house 1040, and IC fab 1050 coexist in a common facility and use common resources.

Design house (or design team) 1020 generates an IC design layout diagram 1022. IC design layout diagram 1022 includes various geometrical patterns designed for an IC device 1060. The geometrical patterns correspond to patterns of metal, oxide, or semiconductor layers that make up the various components of IC device 1060 to be fabricated. The various layers combine to form various IC features. For example, a portion of IC design layout diagram 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout diagram 1022. The design procedure includes one or more of logic design, physical design or place and route. IC design layout diagram 1022 is presented in one or more data files having information of the geometrical patterns. For example, IC design layout diagram 1022 can be expressed in a GDSII file format or DFII file format.

Mask house 1040 includes data preparation 1042 and mask fabrication 1044. Mask house 1040 uses IC design layout diagram 1022 to manufacture one or more masks 1045 to be used for fabricating the various layers of IC device 1060 according to IC design layout diagram 1022. Mask house 1040 performs mask data preparation 1042, where IC design layout diagram 1022 is translated into a representative data file ("RDF"). Mask data preparation 1042 provides the RDF to mask fabrication 1044. Mask fabrication 1044 includes a mask writer. A mask writer converts the RDF to an image on a substrate, such as a mask (reticle) 1045 or a semiconductor wafer 1054. The design layout diagram 1022 is manipulated by mask data preparation 1042 to comply with particular characteristics of the mask writer and/or requirements of IC fab 1050. In FIG. 10, mask data preparation 1042 and mask fabrication 1044 are illustrated as separate elements. In some embodiments, mask data preparation 1042 and mask fabrication 1044 can be collectively referred to as mask data preparation.

In some embodiments, mask data preparation 1042 includes optical proximity correction (OPC) which uses lithography enhancement techniques to compensate for image errors, such as those that can arise from diffraction, interference, other process effects and the like. OPC adjusts IC design layout diagram 1022. In some embodiments, mask data preparation 1042 includes further resolution enhancement techniques (RET), such as off-axis illumination, subresolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1042 includes a mask rule checker (MRC) that checks the IC design layout diagram 1022 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1022 to compensate for limitations during mask fabrication 1044, which may undo part of the modifications performed by OPC in order to meet mask creation rules.

In some embodiments, mask data preparation 1042 includes lithography process checking (LPC) that simulates processing that will be implemented by IC fab 1050 to fabricate IC device 1060. LPC simulates this processing based on IC design layout diagram 1022 to create a simulated manufactured device, such as IC device 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1022.

It should be understood that the above description of mask data preparation 1042 has been simplified for the purposes of clarity. In some embodiments, data preparation 1042 includes additional features such as a logic operation (LOP) to modify the IC design layout diagram 1022 according to manufacturing rules. Additionally, the processes applied to IC design layout diagram 1022 during data preparation 1042 may be executed in a variety of different orders.

After mask data preparation 1042 and during mask fabrication 1044, a mask 1045 or a group of masks 1045 are fabricated based on the modified IC design layout diagram 1022. In some embodiments, mask fabrication 1044 includes performing one or more lithographic exposures based on IC design layout diagram 1022. In some embodiments, an electron-beam (e-beam) or a mechanism of multiple e-beams is used to form a pattern on a mask (photomask or reticle) 1045 based on the modified IC design layout diagram 1022. Mask 1045 can be formed in various technologies. In some embodiments, mask 1045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1045 includes a transparent substrate (e.g., fused quartz) and an opaque material (e.g., chromium) coated in the opaque regions of the binary mask. In another example, mask 1045 is formed using a phase shift technology. In a phase shift mask (PSM) version of mask 1045, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in semiconductor wafer 1054, in an etching process to form various etching regions in semiconductor wafer 1054, and/or in other suitable processes.

IC fab 1050 includes wafer fabrication 1052. IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 uses mask(s) 1045 fabricated by mask house 1040 to fabricate IC device 1060. Thus, IC fab 1050 at least indirectly uses IC design layout diagram 1022 to fabricate IC device 1060. In some embodiments, semiconductor wafer 1054 is fabricated by IC fab 1050 using mask(s) 1045 to form IC device 1060. In some embodiments, the IC fabrication includes performing one or more lithographic exposures based at least indirectly on IC design layout diagram 1022. Semiconductor wafer 1054 includes a silicon substrate or other proper substrate having material layers formed thereon. Semiconductor wafer 1054 further includes one or more of various doped regions, dielectric features, multi-level interconnects, and the like (formed at subsequent manufacturing steps).

Details regarding an integrated circuit (IC) manufacturing system (e.g., system 1000 of FIG. 10), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a system (for generating a layout diagram of a wire routing arrangement in a multi-patterning context having multiple masks, the layout diagram being stored on a non-transitory computer-readable medium) comprises at least one processor and at least one memory including computer program code for one or more programs, and wherein the at least one memory, the computer program code and the at least one processor are configured to cause the system to execute generating the layout diagram including: placing, relative to a given one of the masks, a given cut pattern at a first candidate location over a corresponding portion of a given conductive pattern in a metallization layer; determining whether the first candidate location results in a group of cut patterns which violates a design rule; and temporarily preventing placement of the given cut pattern in the metallization layer at the first candidate location until a correction is made which avoids violating the design rule; and wherein the layout diagram is organized into rows, each row extending in a first direction; the group of cut patterns further includes one or more other cut patterns at one or more locations over one or more corresponding portions of one or more other conductive patterns in the metallization layer; and the determining whether the first candidate location results in a group of cut patterns which violates a design rule includes: checking whether the given cut pattern and the one or more other cut patterns in the group are dispersed across the rows such that the group is multi-row group; and checking whether a tally of cut patterns in the cyclic group is an odd number.

In some embodiments, placement of the given cut pattern in the first candidate location would result in formation of a non-circular group such that the given cut pattern is included therein; the non-circular group further includes one or more other cut patterns at one or more locations over one or more corresponding portions of one or more other conductive patterns in the metallization layer; each row, relative to a second direction, has first and second boundaries; and the determining whether the first candidate location results in at least one of a non-circular group or a cyclic group which violates a design rule includes: checking whether each of first and second ones of the given cut pattern and the one or more other cut patterns in the non-circular group, representing corresponding first and second border patterns, relative to the second direction, abuts a same one of the first and second boundaries of the row; and checking whether the tally of cut patterns in the non-circular group is an even number.

In some embodiments, placement of the given cut pattern in the first candidate location would result in formation of a non-circular group such that the given cut pattern is included therein; the non-circular group further one or more other cut patterns at one or more locations over one or more corresponding portions of one or more other conductive patterns in the metallization layer; each row, relative to a second direction, has first and second boundaries; and the determining whether the first candidate location results in at least one of a non-circular group or a cyclic group which violates a design rule includes: checking whether first and second ones of the given cut pattern and the one or more other cut patterns in the non-circular group, representing corresponding first and second border patterns, relative to the second direction, correspondingly abut the first and second boundaries of the row; and checking whether the tally of cut patterns in the non-circular group is an odd number.

In some embodiments, placement of the given cut pattern in the first candidate location would result in formation of a cyclic group such that the given cut pattern is included therein; and the at least one memory, the computer program code and the at least one processor are further configured to cause the system to execute making a correction to the cyclic group including: relocating the given cut pattern or one of the one or more other cut patterns in the cyclic group correspondingly at a second candidate location over one or more corresponding portions of one or more of the given conductive pattern or the other conductive patterns in the metallization layer resulting in a revised cyclic group; determining whether the second candidate location avoids violating a design rule, the determining being performed on a real-time basis; and placing, if violation is avoided, the given cut pattern or at least one of the one or more other cut patterns at the second candidate location in the metallization layer.

In some embodiments, the system further includes at least one of: a masking facility configured to fabricate one or more semiconductor masks based on based on the layout diagram; or a fabricating facility configured to fabricate at least one component in a layer of a semiconductor device based on the layout diagram.

A system (for generating a layout diagram of a wire routing arrangement in a multi-patterning context having multiple masks, the layout diagram is organized into rows extending in a first direction, the layout diagram being stored on a non-transitory computer-readable medium) includes at least one processor and at least one memory including computer program code for one or more programs, and wherein the at least one memory, the computer program code and the at least one processor are configured to cause the system to execute generating the layout diagram including: placing, relative to a given one of the masks, a given cut pattern at a first candidate location over a corresponding portion of a given conductive pattern in a metallization layer, the given cut pattern and other cut patterns extending in a second direction perpendicular to the first direction; determining that the first candidate location results in an intra-row non-circular group of a given row which violates a design rule, the intra-row non-circular group including first and second cut patterns which abut a same boundary of the given row, and a total number of cut patterns in the being an even number; and temporarily preventing placement of the given cut pattern in the metallization layer at the first candidate location until a correction is made which avoids violating the design rule.

In some embodiments, placement of the given cut pattern in the first candidate location would result in formation of a non-circular group such that the given cut pattern is included therein; and the generating the layout diagram further includes: making a correction to the non-circular group including: relocating the given cut pattern at a second candidate location over the given conductive pattern in the metallization layer, relocating being performed on a real-time basis; checking whether the second candidate location avoids violating the design rule, the checking being performed on a real-time basis; and placing, if violation is avoided, the given cut pattern in the metallization layer at the second candidate location.

In some embodiments, placement of the given cut pattern in the first candidate location would result in formation of a non-circular group such that the given cut pattern is included therein; the non-circular group further includes one or more other cut patterns correspondingly at one or more revised locations over one or more corresponding portions of one or more other conductive patterns in the metallization layer; and the generating (800) the layout diagram further includes: making a correction to the non-circular group including: relocating at least one of the one or more other cut patterns in the non-circular group correspondingly to at least one revised location resulting in a revised non-circular group, the relocating being performed on a real-time basis; checking whether the revised non-circular group avoids violating the design rule, the checking being performed on a real-time basis; and placing, if violation is avoided, the at least one of the one or more other cut patterns at the corresponding at least one revised location.

In some embodiments, placement of the given cut pattern in the first candidate location would result in formation of a non-circular group such that the given cut pattern is included therein; the non-circular group further one or more other cut patterns at one or more locations over one or more corresponding portions of one or more other conductive patterns in the metallization layer; the layout diagram is organized into rows, each row extending in a first direction; each row, relative to a second direction, has first and second boundaries; and the determining whether the first candidate location results in at least one of a non-circular group or a cyclic group which violates a design rule includes: checking whether first and second ones of the given cut pattern and the one or more other cut patterns in the non-circular group, representing corresponding first and second border patterns, relative to the second direction, correspondingly abut the first and second boundaries of the row; and checking whether a tally of cut patterns in the non-circular group is an odd number.

In some embodiments, placement of the given cut pattern in the first candidate location would result in formation of a non-circular group such that the given cut pattern is included therein; the non-circular group further includes one or more other cut patterns at one or more locations over one or more corresponding portions of one or more other conductive patterns in the metallization layer; the layout diagram is organized into rows, each row extending in a second direction; each row is arranged with respect to a predetermined number of tracks, each track extending in a first direction; and short axes of symmetry of the given cut pattern and the one or more other cut patterns of the non-circular group are substantially aligned with corresponding tracks of one of the rows such that the non-circular group is an intra-row non-circular group.

In some embodiments, placement of the given cut pattern in the first candidate location would result in a cyclic group such that the given cut pattern is included therein; the cyclic group further includes one or more other cut patterns at one or more locations over one or more corresponding portions of one or more other conductive patterns in the metallization layer; the layout diagram is organized into rows, each row extending in a first direction; and the determining whether the first candidate location results in at least one of a non-circular group or a cyclic group which violates a design rule includes: checking whether the given cut pattern and the one or more other cut patterns in the cyclic group are dispersed across the rows such that the cyclic group is multi-row cyclic group; and checking whether a tally of cut patterns in the cyclic group is an odd number.

In some embodiments, placement in the first candidate location also would result in formation of a non-circular group such that the given cut pattern is included therein; the non-circular group includes first second, third and fourth non-circular groups; the one or more other cut patterns are included correspondingly in the first, second, third and fourth non-circular groups; each row is arranged with respect to a predetermined number of tracks, each track extending in the first direction; short axes of symmetry of the given cut pattern and the one or more other cut patterns in the first non-circular group are substantially aligned with corresponding tracks of a first one of the rows such that the first non-circular group is an intra-row non-circular group; short axes of symmetry of the one or more other cut patterns in each of the second, third and fourth non-circular groups are substantially aligned with corresponding tracks of second, third and fourth ones of the rows such that each of the second, third and fourth non-circular groups is an intra-row non-circular group; the first, second, third and fourth non-circular groups are located in three of the rows such that: one of the first, second, third and fourth non-circular groups is located in a first one of the rows; two of the first, second, third and fourth non-circular groups are located in a second one of the rows; one of the first, second, third and fourth non-circular groups is located in a third one of the rows; and the second row, relative to a second direction, is located between the first and second rows; and the determining whether the first candidate location results in at least one of a non-circular group or a cyclic group which violates a design rule includes: checking whether a first tally of cut patterns in the first row is an odd or even number and that a second tally of the cut patterns in the third row is a corresponding odd or even number; or checking whether a third tally of cut patterns in the second row is an odd number.

In some embodiments, a method (of generating a layout diagram of a wire routing arrangement in a multi-patterning context having multiple masks, the layout diagram being organized into rows extending in a first direction, the layout diagram being stored on a non-transitory computer-readable medium) includes generating the layout diagram including: placing, relative to a given one of the masks, a given cut pattern at a first candidate location over a corresponding portion of a given conductive pattern in a metallization layer, the given cut pattern and other cut patterns extending in a second direction perpendicular to the first direction; determining that the first candidate location results in an intra-row non-circular group of a given row which violates a design rule, the intra-row non-circular group including first and second cut patterns which correspondingly abut first and second boundaries of the given row, and a total number of cut patterns in the being an odd number; and temporarily preventing placement of the given cut pattern in the metallization layer at the first candidate location until a correction is made which avoids violating the design rule.

In some embodiments, placement of the given cut pattern in the first candidate location would result in formation of a non-circular group such that the given cut pattern is included therein; and the generating (800) the layout diagram further includes making a correction to the non-circular group including: relocating the given cut pattern at a second candidate location over the given conductive pattern in the metallization layer, relocating being performed on a real-time basis; checking whether the second candidate location avoids violating the design rule, the checking being performed on a real-time basis; and placing, if violation is avoided, the given cut pattern in the metallization layer at the second candidate location.

In some embodiments, placement of the given cut pattern in the first candidate location would result in formation of a non-circular group such that the given cut pattern is included therein; the non-circular group further includes one or more other cut patterns correspondingly at one or more revised locations over one or more corresponding portions of one or more other conductive patterns in the metallization layer; and the generating the layout diagram further includes making a correction to the non-circular group including: relocating at least one of the one or more other cut patterns in the non-circular group correspondingly to at least one revised location resulting in a revised non-circular group, the relocating being performed on a real-time basis; checking whether the revised non-circular group avoids violating the design rule, the checking being performed on a real-time basis; and placing, if violation is avoided, the at least one of the one or more other cut patterns at the corresponding at least one revised location.

In some embodiments, placement of the given cut pattern in the first candidate location would result in formation of a non-circular group such that the given cut pattern is included therein; the non-circular group further includes one or more other cut patterns at one or more locations over one or more corresponding portions of one or more other conductive patterns in the metallization layer; the layout diagram is organized into rows, each row extending in a first direction; each row, relative to a second direction, has first and second boundaries; and the determining whether the first candidate location results in at least one of a non-circular group or a cyclic group which violates a design rule includes: checking whether each of first and second ones of the given cut pattern and the one or more other cut patterns in the non-circular group, representing corresponding first and second border patterns, relative to the second direction, abuts a same one of the first and second boundaries of the row; and checking whether a tally of cut patterns in the non-circular group is an even number.

In some embodiments, placement of the given cut pattern in the first candidate location would result in formation of a non-circular group such that the given cut pattern is included therein; the non-circular group further includes one or more other cut patterns at one or more locations over one or more corresponding portions of one or more other conductive patterns in the metallization layer; the layout diagram is organized into rows, each row extending in a second direction; each row is arranged with respect to a predetermined number of tracks, each track extending in a first direction; and short axes of symmetry of the given cut pattern and the one or more other cut patterns of the non-circular group are substantially aligned with corresponding tracks of one of the rows such that the non-circular group is an intra-row non-circular group.

In some embodiments, placement of the given cut pattern in the first candidate location would result in a cyclic group such that the given cut pattern is included therein; the cyclic group further includes one or more other cut patterns at one or more locations over one or more corresponding portions of one or more other conductive patterns in the metallization layer; the layout diagram is organized into rows, each row extending in a first direction; and the determining whether the first candidate location results in at least one of a non-circular group or a cyclic group which violates a design rule includes: checking whether the given cut pattern and the one or more other cut patterns in the cyclic group are dispersed across the rows such that the cyclic group is multi-row cyclic group; and checking whether a tally of cut patterns in the cyclic group is an odd number.

In some embodiments, placement in the first candidate location also would result in formation of a non-circular group such that the given cut pattern is included therein; the non-circular group includes first second, third and fourth non-circular groups; the one or more other cut patterns are included correspondingly in the first, second, third and fourth non-circular groups; each row is arranged with respect to a predetermined number of tracks, each track extending in the first direction; short axes of symmetry of the given cut pattern and the one or more other cut patterns in the first non-circular group are substantially aligned with corresponding tracks of a first one of the rows such that the first non-circular group is an intra-row non-circular group; short axes of symmetry of the one or more other cut patterns in each of the second, third and fourth non-circular groups are substantially aligned with corresponding tracks of second, third and fourth ones of the rows such that each of the second, third and fourth non-circular groups is an intra-row non-circular group; the first, second, third and fourth non-circular groups are located in three of the rows such that: one of the first, second, third and fourth non-circular groups is located in a first one of the rows; two of the first, second, third and fourth non-circular groups are located in a second one of the rows; one of the first, second, third and fourth non-circular groups is located in a third one of the rows; and the second row, relative to a second direction, is located between the first and second rows; and the determining whether the first candidate location results in at least one of a non-circular group or a cyclic group which violates a design rule includes: checking whether a first tally of cut patterns in the first row is an odd or even number and that a second tally of the cut patterns in the third row is a corresponding odd or even number; or checking whether a third tally of cut patterns in the second row is an odd number.

In some embodiments, the method further includes: fabricating, based on the layout diagram, at least one of (A) one or more semiconductor masks or (B) at least one component in a layer of a semiconductor device.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system for generating a layout diagram of a wire routing arrangement in a multi-patterning context having multiple masks, the layout diagram being stored on a non-transitory computer-readable medium, the system comprising:
   at least one processor; and
   at least one memory including computer program code for one or more programs;
   wherein the at least one memory, the computer program code and the at least one processor are configured to cause the system to execute generating the layout diagram including:
      placing, relative to a given one of the masks, a given cut pattern at a first candidate location over a corresponding portion of a given conductive pattern in a metallization layer;
      determining whether the first candidate location results in a group of cut patterns which violates a design rule; and
      temporarily preventing placement of the given cut pattern in the metallization layer at the first candidate location until a correction is made which avoids violating the design rule; and
   wherein:
      the layout diagram is organized into rows, each row extending in a first direction;
      the group of cut patterns further includes one or more other cut patterns at one or more locations over one or more corresponding portions of one or more other conductive patterns in the metallization layer; and
      the determining whether the first candidate location results in a group of cut patterns which violates a design rule includes:
         checking whether the given cut pattern and the one or more other cut patterns in the group are dispersed across the rows such that the group is multi-row group; and
         checking whether a tally of cut patterns in the group is an odd number.

2. The system of claim 1, wherein:
   placement of the given cut pattern in the first candidate location would result in formation of a non-circular group such that the given cut pattern is included therein;
   the non-circular group further includes one or more other cut patterns at one or more locations over one or more corresponding portions of one or more other conductive patterns in the metallization layer;
   each row, relative to a second direction, has first and second boundaries; and
   the determining whether the first candidate location results in at least one of a non-circular group or a cyclic group which violates a design rule includes:

checking whether each of first and second ones of the given cut pattern and the one or more other cut patterns in the non-circular group, representing corresponding first and second border patterns, relative to the second direction, abuts a same one of the first and second boundaries of the row; and checking whether the tally of cut patterns in the non-circular group is an even number.

3. The system of claim 1, wherein:

placement of the given cut pattern in the first candidate location would result in formation of a non-circular group such that the given cut pattern is included therein;

the non-circular group further one or more other cut patterns at one or more locations over one or more corresponding portions of one or more other conductive patterns in the metallization layer;

each row, relative to a second direction, has first and second boundaries; and the determining whether the first candidate location results in at least one of a non-circular group or a cyclic group which violates a design rule includes:

checking whether first and second ones of the given cut pattern and the one or more other cut patterns in the non-circular group, representing corresponding first and second border patterns, relative to the second direction, correspondingly abut the first and second boundaries of the row; and checking whether the tally of cut patterns in the non-circular group is an odd number.

4. The system of claim 1, wherein:

placement of the given cut pattern in the first candidate location would result in formation of a cyclic group such that the given cut pattern is included therein; and the at least one memory, the computer program code and the at least one processor are further configured to cause the system to execute:

making a correction to the cyclic group including:

relocating the given cut pattern or one of the one or more other cut patterns in the cyclic group correspondingly at a second candidate location over one or more corresponding portions of one or more of the given conductive pattern or the other conductive patterns in the metallization layer resulting in a revised cyclic group;

determining whether the second candidate location avoids violating a design rule, the determining being performed on a real-time basis; and placing, if violation is avoided, the given cut pattern or at least one of the one or more other cut patterns at the second candidate location in the metallization layer.

5. The system of claim 1, further comprising at least one of:

a masking facility configured to fabricate one or more semiconductor masks based on based on the layout diagram; or a fabricating facility configured to fabricate at least one component in a layer of a semiconductor device based on the layout diagram.

6. A system for generating a layout diagram of a wire routing arrangement in a multi-patterning context having multiple masks, the layout diagram is organized into rows extending in a first direction, the layout diagram being stored on a non-transitory computer-readable medium, the system comprising:

at least one processor; and at least one memory including computer program code for one or more programs;

wherein the at least one memory, the computer program code and the at least one processor are configured to cause the system to execute generating the layout diagram including:

placing, relative to a given one of the masks, a given cut pattern at a first candidate location over a corresponding portion of a given conductive pattern in a metallization layer, the given cut pattern and other cut patterns extending in a second direction perpendicular to the first direction;

determining that the first candidate location results in an intra-row non-circular group of a given row which violates a design rule, the intra-row non-circular group including first and second cut patterns which abut a same boundary of the given row, and a total number of cut patterns in the being an even number; and temporarily preventing placement of the given cut pattern in the metallization layer at the first candidate location until a correction is made which avoids violating the design rule.

7. The system of claim 6, wherein:

placement of the given cut pattern in the first candidate location would result in formation of a non-circular group such that the given cut pattern is included therein; and the generating (800) the layout diagram further includes:

making a correction to the non-circular group including:

relocating the given cut pattern at a second candidate location over the given conductive pattern in the metallization layer, relocating being performed on a real-time basis;

checking whether the second candidate location avoids violating the design rule, the checking being performed on a real-time basis; and placing, if violation is avoided, the given cut pattern in the metallization layer at the second candidate location.

8. The system of claim 6, wherein:

placement of the given cut pattern in the first candidate location would result in formation of a non-circular group such that the given cut pattern is included therein;

the non-circular group further includes one or more other cut patterns correspondingly at one or more revised locations over one or more corresponding portions of one or more other conductive patterns in the metallization layer; and the generating (800) the layout diagram further includes:

making a correction to the non-circular group including:

relocating at least one of the one or more other cut patterns in the non-circular group correspondingly to at least one revised location resulting in a revised non-circular group, the relocating being performed on a real-time basis;

checking whether the revised non-circular group avoids violating the design rule, the checking being performed on a real-time basis; and placing, if violation is avoided, the at least one of the one or more other cut patterns at the corresponding at least one revised location.

9. The system of claim 6, wherein:
placement of the given cut pattern in the first candidate location would result in formation of a non-circular group such that the given cut pattern is included therein;
the non-circular group further one or more other cut patterns at one or more locations over one or more corresponding portions of one or more other conductive patterns in the metallization layer;
the layout diagram is organized into rows, each row extending in a first direction;
each row, relative to a second direction, has first and second boundaries; and
the determining whether the first candidate location results in at least one of a non-circular group or a cyclic group which violates a design rule includes:
checking whether first and second ones of the given cut pattern and the one or more other cut patterns in the non-circular group, representing corresponding first and second border patterns, relative to the second direction, correspondingly abut the first and second boundaries of the row; and
checking whether a tally of cut patterns in the non-circular group is an odd number.

10. The system of claim 6, wherein:
placement of the given cut pattern in the first candidate location would result in formation of a non-circular group such that the given cut pattern is included therein;
the non-circular group further includes one or more other cut patterns at one or more locations over one or more corresponding portions of one or more other conductive patterns in the metallization layer;
the layout diagram is organized into rows, each row extending in a second direction;
each row is arranged with respect to a predetermined number of tracks, each track extending in a first direction; and
short axes of symmetry of the given cut pattern and the one or more other cut patterns of the non-circular group are substantially aligned with corresponding tracks of one of the rows such that the non-circular group is an intra-row non-circular group.

11. The system of claim 6, wherein:
placement of the given cut pattern in the first candidate location would result in a cyclic group such that the given cut pattern is included therein;
the cyclic group further includes one or more other cut patterns at one or more locations over one or more corresponding portions of one or more other conductive patterns in the metallization layer;
the layout diagram is organized into rows, each row extending in a first direction; and
the determining whether the first candidate location results in at least one of a non-circular group or a cyclic group which violates a design rule includes:
checking whether the given cut pattern and the one or more other cut patterns in the cyclic group are dispersed across the rows such that the cyclic group is multi-row cyclic group; and
checking whether a tally of cut patterns in the cyclic group is an odd number.

12. The system of claim 11, wherein:
placement in the first candidate location also would result in formation of a non-circular group such that the given cut pattern is included therein;
the non-circular group includes first second, third and fourth non-circular groups;
the one or more other cut patterns are included correspondingly in the first, second, third and fourth non-circular groups;
each row is arranged with respect to a predetermined number of tracks, each track extending in the first direction;
short axes of symmetry of the given cut pattern and the one or more other cut patterns in the first non-circular group are substantially aligned with corresponding tracks of a first one of the rows such that the first non-circular group is an intra-row non-circular group;
short axes of symmetry of the one or more other cut patterns in each of the second, third and fourth non-circular groups are substantially aligned with corresponding tracks of second, third and fourth ones of the rows such that each of the second, third and fourth non-circular groups is an intra-row non-circular group;
the first, second, third and fourth non-circular groups are located in three of the rows such that:
one of the first, second, third and fourth non-circular groups is located in a first one of the rows;
two of the first, second, third and fourth non-circular groups are located in a second one of the rows;
one of the first, second, third and fourth non-circular groups is located in a third one of the rows; and
the second row, relative to a second direction, is located between the first and second rows; and
the determining whether the first candidate location results in at least one of a non-circular group or a cyclic group which violates a design rule includes:
checking whether a first tally of cut patterns in the first row is an odd or even number and that a second tally of the cut patterns in the third row is a corresponding odd or even number; or
checking whether a third tally of cut patterns in the second row is an odd number.

13. A method of generating a layout diagram of a wire routing arrangement in a multi-patterning context having multiple masks, the layout diagram being organized into rows extending in a first direction, the layout diagram being stored on a non-transitory computer-readable medium, the method comprising generating the layout diagram including:
placing, relative to a given one of the masks, a given cut pattern at a first candidate location over a corresponding portion of a given conductive pattern in a metallization layer, the given cut pattern and other cut patterns extending in a second direction perpendicular to the first direction;
determining that the first candidate location results in an intra-row non-circular group of a given row which violates a design rule, the intra-row non-circular group including first and second cut patterns which correspondingly abut first and second boundaries of the given row, and a total number of cut patterns in the being an odd number; and
temporarily preventing placement of the given cut pattern in the metallization layer at the first candidate location until a correction is made which avoids violating the design rule.

14. The method of claim 13, wherein:
placement of the given cut pattern in the first candidate location would result in formation of a non-circular group such that the given cut pattern is included therein; and the generating the layout diagram further includes:
  making a correction to the non-circular group including:
    relocating the given cut pattern at a second candidate location over the given conductive pattern in the metallization layer, relocating being performed on a real-time basis;
    checking whether the second candidate location avoids violating the design rule, the checking being performed on a real-time basis; and
    placing, if violation is avoided, the given cut pattern in the metallization layer at the second candidate location.

15. The method of claim 13, wherein:
placement of the given cut pattern in the first candidate location would result in formation of a non-circular group such that the given cut pattern is included therein;
the non-circular group further includes one or more other cut patterns correspondingly at one or more revised locations over one or more corresponding portions of one or more other conductive patterns in the metallization layer; and
the generating the layout diagram further includes:
  making a correction to the non-circular group including:
    relocating at least one of the one or more other cut patterns in the non-circular group correspondingly to at least one revised location resulting in a revised non-circular group, the relocating being performed on a real-time basis;
    checking whether the revised non-circular group avoids violating the design rule, the checking being performed on a real-time basis; and
    placing, if violation is avoided, the at least one of the one or more other cut patterns at the corresponding at least one revised location.

16. The method of claim 13, wherein:
placement of the given cut pattern in the first candidate location would result in formation of a non-circular group such that the given cut pattern is included therein;
the non-circular group further includes one or more other cut patterns at one or more locations over one or more corresponding portions of one or more other conductive patterns in the metallization layer;
the layout diagram is organized into rows, each row extending in a first direction;
each row, relative to a second direction, has first and second boundaries; and
the determining whether the first candidate location results in at least one of a non-circular group or a cyclic group which violates a design rule includes:
  checking whether each of first and second ones of the given cut pattern and the one or more other cut patterns in the non-circular group, representing corresponding first and second border patterns, relative to the second direction, abuts a same one of the first and second boundaries of the row; and
  checking whether a tally of cut patterns in the non-circular group is an even number.

17. The method of claim 13, wherein:
placement of the given cut pattern in the first candidate location would result in formation of a non-circular group such that the given cut pattern is included therein;
the non-circular group further includes one or more other cut patterns at one or more locations over one or more corresponding portions of one or more other conductive patterns in the metallization layer;
the layout diagram is organized into rows, each row extending in a second direction;
each row is arranged with respect to a predetermined number of tracks, each track extending in a first direction; and
short axes of symmetry of the given cut pattern and the one or more other cut patterns of the non-circular group are substantially aligned with corresponding tracks of one of the rows such that the non-circular group is an intra-row non-circular group.

18. The method of claim 13, wherein:
placement of the given cut pattern in the first candidate location would result in a cyclic group such that the given cut pattern is included therein;
the cyclic group further includes one or more other cut patterns at one or more locations over one or more corresponding portions of one or more other conductive patterns in the metallization layer;
the layout diagram is organized into rows, each row extending in a first direction; and
the determining whether the first candidate location results in at least one of a non-circular group or a cyclic group which violates a design rule includes:
  checking whether the given cut pattern and the one or more other cut patterns in the cyclic group are dispersed across the rows such that the cyclic group is multi-row cyclic group; and
  checking whether a tally of cut patterns in the cyclic group is an odd number.

19. The method of claim 18, wherein:
placement in the first candidate location also would result in formation of a non-circular group such that the given cut pattern is included therein;
the non-circular group includes first second, third and fourth non-circular groups;
the one or more other cut patterns are included correspondingly in the first, second, third and fourth non-circular groups;
each row is arranged with respect to a predetermined number of tracks, each track extending in the first direction;
short axes of symmetry of the given cut pattern and the one or more other cut patterns in the first non-circular group are substantially aligned with corresponding tracks of a first one of the rows such that the first non-circular group is an intra-row non-circular group;
short axes of symmetry of the one or more other cut patterns in each of the second, third and fourth non-circular groups are substantially aligned with corresponding tracks of second, third and fourth ones of the rows such that each of the second, third and fourth non-circular groups is an intra-row non-circular group;
the first, second, third and fourth non-circular groups are located in three of the rows such that:
  one of the first, second, third and fourth non-circular groups is located in a first one of the rows;
  two of the first, second, third and fourth non-circular groups are located in a second one of the rows;
  one of the first, second, third and fourth non-circular groups is located in a third one of the rows; and
  the second row, relative to a second direction, is located between the first and second rows; and the determining whether the first candidate location results in at least one of a non-circular group or a cyclic group which violates a design rule includes:
   checking whether a first tally of cut patterns in the first row is an odd or even number and that a second tally of the cut patterns in the third row is a corresponding odd or even number; or
   checking whether a third tally of cut patterns in the second row is an odd number.

20. The method of claim 13, further comprising:
fabricating, based on the layout diagram, at least one of (A) one or more semiconductor masks or (B) at least one component in a layer of a semiconductor device.

* * * * *